United States Patent
Kassas et al.

(10) Patent No.: US 11,953,607 B2
(45) Date of Patent: Apr. 9, 2024

(54) NAVIGATION WITH DIFFERENTIAL CARRIER PHASE MEASUREMENT FROM LOW EARTH ORBIT SATELLITES

(71) Applicant: The Regents of the University of California, Oakland, CA (US)

(72) Inventors: Zak Kassas, Irvine, CA (US); Joe Khalife, Irvine, CA (US); Mohammad Neinavaie, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 49 days.

(21) Appl. No.: 17/367,025

(22) Filed: Jul. 2, 2021

(65) Prior Publication Data

US 2022/0075079 A1 Mar. 10, 2022

Related U.S. Application Data

(60) Provisional application No. 63/047,796, filed on Jul. 2, 2020.

(51) Int. Cl.
*G01S 19/44* (2010.01)
*G01S 19/39* (2010.01)

(52) U.S. Cl.
CPC ............ *G01S 19/44* (2013.01); *G01S 19/393* (2019.08)

(58) Field of Classification Search
CPC .................. G01S 19/393; G01S 19/04; G01S 19/40–44
See application file for complete search history.

(56) References Cited

U.S. PATENT DOCUMENTS 6,100,842 A * 8/2000 Dreier ..................... G01S 19/04
342/357.41
6,373,432 B1 * 4/2002 Rabinowitz ........ H04B 7/18552
342/357.29

(Continued)

OTHER PUBLICATIONS

Li, Sheng-Yi and C.H. Liu, "An Analytical Model to Predict the Probability Density Function of Elevation Angles for LEO Satellite Systems", IEEE Communications Letters, vol. 6, No. 4, Apr. 2002 (Year: 2002).*

*Primary Examiner* — Cassi J Galt
(74) *Attorney, Agent, or Firm* — John P. Teresinski; Stites & Harbison, PLLC

(57) ABSTRACT

Systems, device configurations, and processes are provided for navigation and determination of navigation observables based on low Earth orbit (LEO) satellite signals. A method for navigation includes using differential carrier phase measurement of LEO signals including correction of position estimates using integer ambiguity resolution and double difference carrier phase determinations. Frameworks described herein can use a computationally efficient integer ambiguity resolution to reduce the size of the integer least squares (ILS) determination. The framework may include a joint probability density function (pdf) of the megaconstellation LEO satellites' azimuth and elevation angle to characterize a LEO system. Embodiments are also directed to correction of ambiguities of carrier phase differential (CD)-low Earth orbit (LEO) (CD-LEO) measurements that may utilize a base and a rover without requiring prior knowledge of rover position.

20 Claims, 14 Drawing Sheets

(56) References Cited

U.S. PATENT DOCUMENTS 7,489,926 B2 * 2/2009 Whelan ................ G01S 19/26
  455/12.1
2015/0219767 A1 * 8/2015 Humphreys .......... G01S 19/485
  342/357.26

* cited by examiner

NAVIGATION WITH DIFFERENTIAL CARRIER PHASE MEASUREMENT FROM LOW EARTH ORBIT SATELLITES

CROSS REFERENCE TO RELATED APPLICATION

This application claims priority to U.S. provisional application No. 63/047,796 titled NAVIGATION WITH DIFFERENTIAL CARRIER PHASE MEASUREMENT FROM LOW EARTH ORBIT SATELLITES filed on Jul. 2, 2020, the content of which is expressly incorporated by reference in its entirety.

STATEMENT OF GOVERNMENT SUPPORT

This invention was made with Government support under Grant No. N00014-19-1-2511 awarded by the Office of Naval Research and National Science Foundation (NSF) under Grant 1929965. The Government has certain rights in the invention.

FIELD

The present disclosure generally relates to positioning and navigation using low Earth orbit (LEO) signals, frameworks for carrier phase differential (CD)-low Earth orbit (LEO) (CD-LEO) measurements, and corrections of CD-LEO measurements and device localization.

BACKGROUND

Global navigation satellite systems (GNSS) have been at the heart of outdoor positioning systems. However, GNSS signals could become unusable or untrustworthy in certain situations. One alternative to GNSS signals may be signals from low Earth orbit (LEO) satellites. The coming decade is slated to witness a space revolution with the launch of tens of thousands of low Earth orbit (LEO) satellites for broadband communication. There is a desire for use of LEO satellites for navigation. However, LEO satellite signals are not intended for navigation and such systems would require significant changes to existing infrastructure to allow for navigation services. While there are existing approaches for use of low Earth orbit (LEO) satellite signals, these existing approaches are not accurate for positioning. There exists a need for LEO satellite frameworks and configurations to allow for device configurations and frameworks with improved accuracy.

BRIEF SUMMARY OF THE EMBODIMENTS

One or more embodiments are directed to navigation with differential carrier phase measurement from low earth orbit (LEO) satellites.

In one embodiment, a method for navigation is provided using differential carrier phase measurement of low earth orbit (LEO) satellite signals. The method includes receiving, by a device, one or more low earth orbit (LEO) satellite signals, and receiving, by the device, observables for the one or more LEO satellite signals from a base. The method also includes determining, by the device, a position estimate for the device using carrier phase determinations of the one or more LEO satellite signals received by the device and observables from the base, and correcting, by the device, the position estimate, wherein correcting is based on an integer ambiguity resolution operation and double difference carrier phase determination for the one or more LEO satellite signals. The method also includes determining, by the device, at least one navigation observable using a corrected position estimate.

In one embodiment, the device receives signals from at least two LEO satellite vehicles, and wherein receiving includes receiving estimates of LEO satellite vehicle position.

In one embodiment, the device receives base position and carrier phase observables determined by the base, the base having a known position.

In one embodiment, determining a position estimate includes determining a position estimate for the device in at least one of a stationary and moving state.

In one embodiment, determining a position estimate includes performing a batch-weighted nonlinear least squares (B-WNLS) operation over a window of steps.

In one embodiment, determining a position estimate includes performing an extended Kalman filter operation to estimate position and velocity of the device from single difference measurements.

In one embodiment, carrier phase determinations include differential carrier phase measurements using a simultaneous tracking and navigation framework (STAN) to estimate LEO satellite vehicle states.

In one embodiment, correcting the position estimate includes performing a point-solution weighted non-linear least squares (PS-WNLS) to estimate rover position in real time.

In one embodiment, correcting the position estimate includes performing a joint probability density function (pdf) of megaconstellation LEO satellite azimuth and elevation angles to characterize a LEO satellite sources.

In one embodiment, the navigation observable includes real-time position of the device.

Another embodiment is directed to a device configured for navigation using differential carrier phase measurement of low earth orbit (LEO) satellites, the device including a receiver and a controller. The receiver of the device is configured to receive one or more low earth orbit (LEO) satellite signals, and receive observables for the one or more LEO satellite signals from a base. The controller is configured to determine a position estimate for the device using carrier phase determinations of the one or more LEO satellite signals received by the device and the observables from the base. The controller is also configured to correct the position estimate, wherein correcting is based on an integer ambiguity resolution operation and double difference carrier phase determination for the one or more LEO satellite signals. The controller is also configured to determine at least one navigation observable using a corrected position estimate.

Other aspects, features, and techniques will be apparent to one skilled in the relevant art in view of the following detailed description of the embodiments.

BRIEF DESCRIPTION OF THE DRAWINGS

The application file contains at least one drawing executed in color. Copies of this patent or patent application publication with color drawing(s) will be provided by the Office upon request and payment of the necessary fee.

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1:
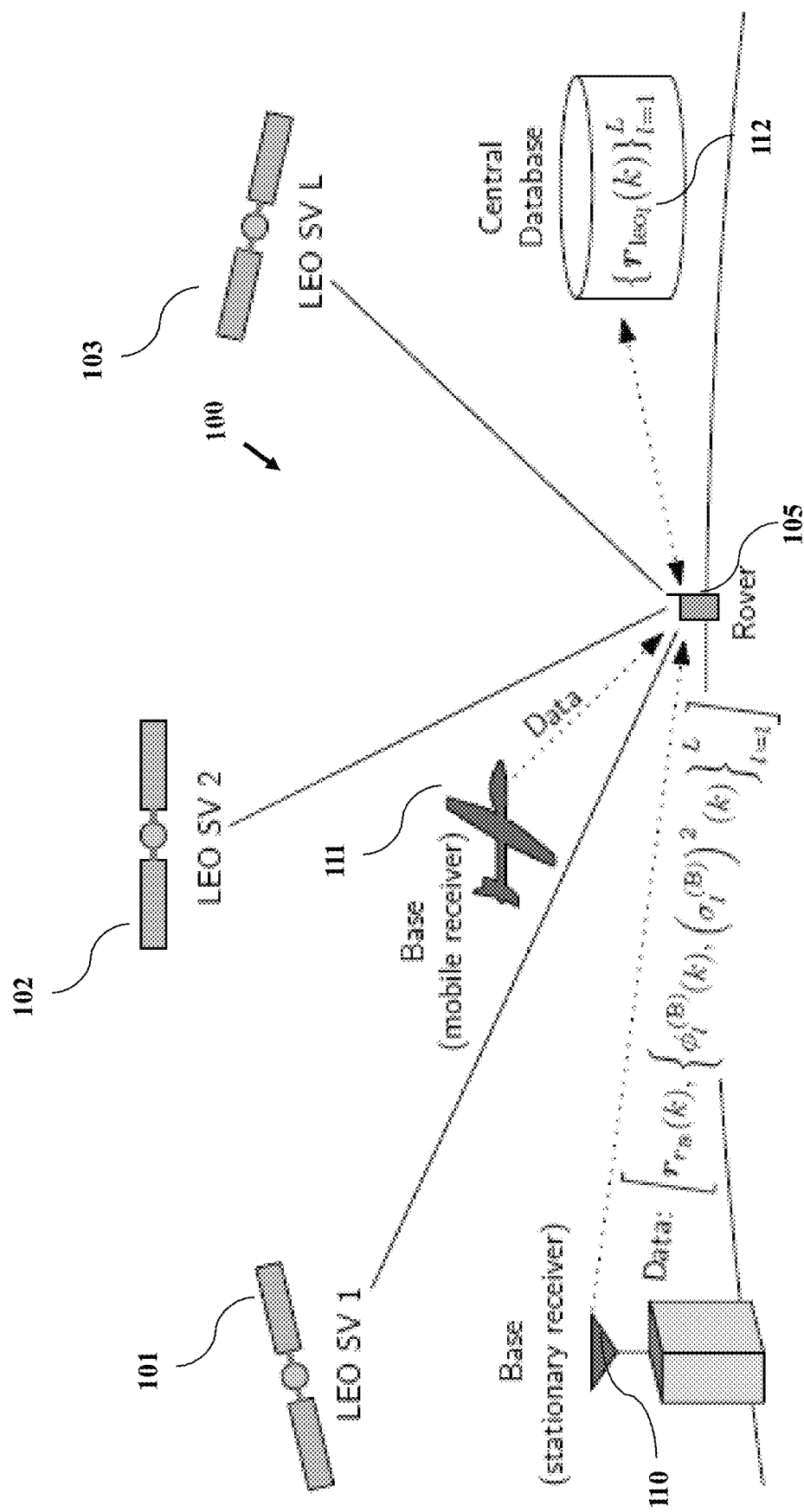
FIG. 1 illustrates navigation with differential carrier phase measurement from low earth orbit (LEO) satellites according to one or more embodiments.

Aspects of this disclosure are directed to a receiver that can produce navigation observables from LEO satellite signals, a navigation framework for megaconstellation LEO satellites and megaconstellation LEO satellite error sources, and navigation performance with megaconstellation LEO satellites. Device configurations and processes are provided for navigation with differential carrier phase measurement from low earth orbit satellites.

Low Earth orbit (LEO) satellite signals can be a free navigation source which alleviate the need for other costly aiding-sensors. LEO satellites transmit at a wide range of frequencies and directions, making them an attractive either supplement to GNSS signals to improve the accuracy of a navigation solution. Moreover, LEO satellite signals are abundant in GNSS-challenged environments, making them particularly attractive navigation sources when GNSS signals become unreliable. However, LEO satellite signals are not intended for navigation. As such, three main challenges must be addressed to use LEO signals for navigation: 1) there are no publicly available receivers that can produce navigation observables from LEO satellite signals, 2) existing navigation frameworks do not apply in a straight forward fashion to megaconstellation LEO satellites due to the unique error sources associated with megaconstellation LEO satellites, and 3) the achievable navigation performance with megaconstellation LEO satellites is not fully characterized.

Embodiments are directed to processes and configurations for navigation operations, including localization, error correction, and positioning, based on differential carrier phase measurements from LEO satellite signals. Navigation may also include opportunistic navigation based on differential carrier phase measurements from broadband LEO satellite signals. Opportunistic navigation, as used herein, can include exploiting ambient radio signals of opportunity (SOPs) for positioning and timing. Besides LEO satellite signals, other SOPs can include AM/FM radio, digital television, WiFi, and cellular broadcast signals, with the latter showing the promise of a submeter-accurate navigation solution for unmanned aerial vehicles (UAVs) when carrier phase measurements from cellular signals are used. LEO satellites possess desirable attributes for positioning in GNSS-challenged environments: (i) they are around twenty times closer to Earth compared to GNSS satellites, which reside in medium Earth orbit (MEO), making their received signal power between 24 to 34 dBs higher than GNSS signals; (ii) they will become abundant as tens of thousands of broadband Internet satellites are expected to be deployed into LEO; and (iii) each broadband provider will deploy broadband Internet satellites into unique constellations, transmitting at different frequency bands, making LEO satellite signals diverse in frequency and direction.

In one embodiment, a method for differential carrier phase measurement from low earth orbit (LEO) satellites is provided. The method includes receiving, by a device, one or more low earth orbit (LEO) satellite signals, determining, by the device, a position of the device, based on a differential carrier phase measurement, and correcting, by the device, the position determination, wherein correcting is based on an integer least squares (ILS) operation to reduce ambiguity associated with each carrier phase determination.

In one embodiment, correcting is based on a joint probability density function (pdf) of megaconstellation LEO satellite azimuth and elevation angle to characterize an LEO system. Another embodiment is directed to a device configured for differential carrier phase measurement from low earth orbit (LEO) satellites. The device includes a receiver configured to receive one or more low earth orbit (LEO) satellite signals and a controller. The controller is configured to determine a position of the device, based on a differential carrier phase measurement, and correct the position determination, wherein correcting is based on an integer least squares (ILS) operation to reduce ambiguity associated with each carrier phase determination.

Keplerian elements parameterizing the orbits of these LEO satellites are made publicly available by the North American Aerospace Defense Command (NORAD) and are updated daily in the two-line element (TLE) files. Using TLEs and orbit determination algorithms (e.g., SGP4), the positions and velocities of these satellites can be known, albeit not precisely. In addition, some of these broadband LEO satellites, such as Orbcomm satellites, are equipped with GPS receivers and broadcast their GPS solution to terrestrial receivers.

One or more embodiments are directed to navigating exclusively with LEO satellite signals in environments where GNSS signals are unavailable or untrustworthy. Processes, device configurations and systems as described herein overcome several challenges of using LEO satellite signals and can allow for navigation using only LEO satellite signals.

According to one embodiment, a carrier phase differential (CD)-LEO navigation framework is developed for real broadband LEO satellite signals using a proprietary integer ambiguity resolution method. The performance and complexity of the integer ambiguity resolution method are also characterized. Second, probability density functions (pdfs) of megaconstellation LEO satellites' azimuth and elevation angles are determined. These pdfs can study the performance of LEO satellite-based navigation. Third, the performance of the CD-LEO framework is characterized using the derived pdfs by analyzing (i) the position dilution of precision (PDOP) of megaconstellation LEO satellites, (ii) the measurement residuals due to ephemeris errors, and (iii) the measurement residuals due to integer ambiguity estimation errors as a function of the system design parameters, more precisely, the differential baseline and the batch size. Processes and configurations are provided that can allow for a desired performance. Fourth, experimental results are presented showing an unmanned aerial vehicle (UAV) localizing itself with real LEO satellite signals using differential carrier phase measurements to an acceptable level of accuracy.

In certain embodiments, processes and configurations are directed to a base and rover configuration and for navigation with the LEO satellite configurations, such as an Orbcomm LEO constellation, without requiring prior knowledge of the rover's position. Features are provided to correct CD-LEO measurements. In one embodiment, a system includes a rover and a base receiver with one or more visible LEO SVs. The base receiver is configured to determine its own position state. The base receiver may be configured to communicate its own position and carrier phase observables to the rover. The rover may be configured to determine position based on base receiver provided carrier phase observables. According to another embodiment, the rover is also configured to determine position based on base receiver provided carrier phase observables and carrier phase differential (CD)-low Earth orbit (LEO) (CD-LEO) measurements.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

EXEMPLARY EMBODIMENTS

FIG. 1 illustrates navigation with differential carrier phase measurement from low earth orbit satellites according to one or more embodiments. According to one embodiment, a system 100 may be configured for navigation with low earth orbit (LEO) satellites, such as low earth orbit satellites 101, 102 and 103. System 100 includes a device, such as a receiver, which may be included in or be part of rover 105, base station 110, and base station 111. In certain embodiments, system 100 may include central database 112.

According to one embodiment, a receiver onboard rover 105 is configured to perform carrier phase measurements from broadband LEO satellites and a base station, in the vicinity of the rover, such as at least one of base station 110 and base station 111. Base station 110 and base station 111 are each configured to perform carrier phase measurements with the same LEO satellites as rover 105. According to one embodiment, a device onboard rover 105 can form double-difference carrier phase measurements from base and rover measurements, called carrier phase differential-LEO (CD-LEO) measurements, and solve for the rover's position as well as for the resulting integer ambiguities. In system 100, and in a base/rover CD-LEO framework as described herein, the base station may be stationary, such as base station 110, or mobile (e.g., high-flying aerial vehicle), such as base station 111.

FIG. 1 shows base stations 110 and 111 configured to receive signals, such as downlink transmissions, from a plurality of low Earth orbit satellites. In one embodiment, the base stations 110 and 111 may be equipped with an altimeter. Base stations 110 and 111 may detect multiple low Earth Orbit (LEO) satellite transmission and downlink channels 1211,1, wherein direct quadrature phase shift keying (QPSK) signals are transmitted. Base stations 110 and 111 may be configured to detect downlink signals and transmission from one or more visible low earth orbit (LEO) satellites. The position of LEO satellites 101, 102 and 103 may be characterized by TLE files and orbit determination software, or by decoding the transmitted ephemeris, if any.

System 100 and processes described herein may be configured to produce navigation observables and navigation from LEO satellite signals, operate with megaconstellation LEO satellites and account for error sources associated with megaconstellation LEO satellites, and provide navigation performance for megaconstellation LEO satellites. Megaconstellations may include hundreds to thousands of satellites deployed in low-earth orbits.

System 100 may be configured to perform one or more operations for position determination. System 100 and processes described herein can also correct for one or more sources of error. By way of example, without any position priors, rover 105 cannot perform real-time positioning and must wait until there is enough change in satellite geometry and solve a batch least squares to estimate its position and the integer ambiguities. According to one embodiment, to optimally resolve the integer ambiguities, processes and device configurations are provided for rover 105 to perform an integer least squares (ILS) estimator. However, the complexity of the ILS grows exponentially with the number of ambiguities. In certain LEO constellations, hundreds of satellites are expected to be visible at any point in time and almost anywhere on Earth, making the ILS approach infeasible. To address this issue, embodiments provide processes for an integer ambiguity resolution algorithm that approaches the performance of the ILS but with the fraction of its complexity. Once the ambiguities are resolved, the rover can perform real-time positioning.

Elements of system 100, such as rover 105 may be configured to perform one or more processes to resolve integer ambiguity and reduce the size of the integer least-squares (ILS) problem, whose complexity grows exponentially with the number of satellites. With respect to a megaconstellation example (e.g., the Starlink®, etc.), a 60% reduction in the size of the ILS problem may be provided. Embodiments including determination of a joint probability density function of the megaconstellation LEO satellites' azimuth and elevation angles for efficient and accurate performance characterization of navigation frameworks with LEO satellites, and to facilitate system parameter design to meet desired performance requirements. Experimental results are presented showing an unmanned aerial vehicle (UAV) navigating for 2.28 km exclusively using signals from only two Orbcomm LEO satellites via the proposed framework, achieving an unprecedented position root mean squared error of 14.8 m over a period of 2 minutes.

Integer ambiguity resolution operations and the magnitude of the CD-LEO measurement residuals due to ephemeris errors may heavily depend on the satellite-to-receiver geometry, which is captured by the satellites' azimuth and elevation angles. Subsequently, it is of paramount importance to characterize the distribution of these angles for LEO megaconstellations. In contrast to approximation of angles marginal distributions or study the elevation angle distribution for small constellations, embodiments characterize the full joint distribution of the azimuth and elevation angles for LEO megaconstellation satellites. This characterization enables several efficient and insightful performance analyses, as well as facilitates performance driven framework design, i.e., design system parameters to meet desired performance requirements.

System 100 and processes described herein may be configured to address error in the satellite positions obtained from the TLE files. These errors can be on the order of kilometers as the orbit is propagated way beyond the epoch at which the TLE file was generated. Blindly using the satellite positions obtained from the TLE files introduces significant errors in the measurement residuals. Although the double-difference carrier phase measurements will cancel out most of these errors, there will still be significant errors if the base and rover are too far apart. These errors may be too large to ignore if an accurate navigation solution is desired. Embodiments characterize this error and its statistics as a function of the differential baseline, from which the baseline can be designed to guarantee a desirable performance.

System 100 and processes described herein allow for carrier phase measurements to provide a high level of precision and enable a sub-meter level navigation solution when megaconstellation LEO ambiguities are resolved. Once ambiguities are resolved, rover 105 can perform real-time positioning.

Figure 2:
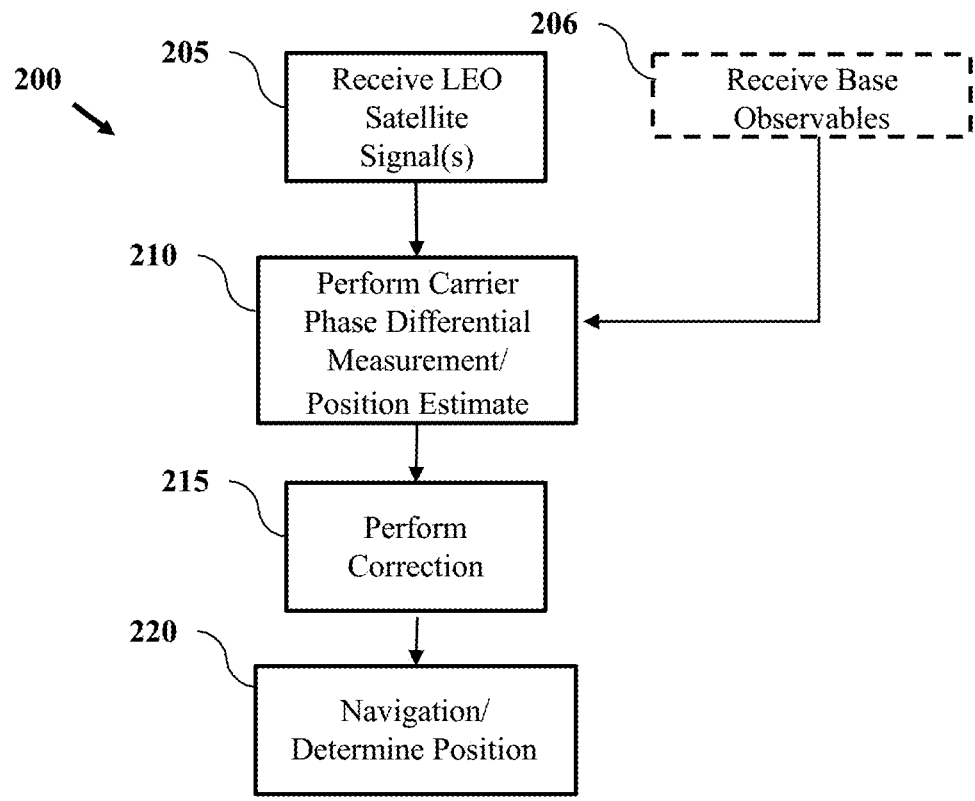
FIG. 2 illustrates a process for carrier phase measurement and position determinations using low earth orbit (LEO) satellite signals according to one or more embodiments.

FIG. 2 illustrates a process for carrier phase measurement determinations using low earth orbit (LEO) satellite signals according to one or more embodiments. According to one embodiment, process 200 may be performed by a device, such as a rover (e.g., rover 105). As described herein, process 200 and operations described herein may be performed to allow for devices, such as an unmanned aerial vehicle (UAV), rover, or device in general, to localize itself using transmissions from LEO satellite signals and carrier phase measurements of the LEO satellite signals. Process 200 may be performed for navigation using differential carrier phase measurement of LEO satellite signals.

Process 200 may be initiated by a device, such as a receiver on a rover (e.g., rover 105), receiving one or more transmissions from LEO satellites at block 205. The receiver may be configured to listen for one or more satellite signals, such as downlink transmissions. In one embodiment, signals detected by a receiver of device include direct quadrature phase shift keying (QPSK) signals. QPSK signals received from satellites as well as satellite data can be used to determine a receiver's position. Embodiments described herein provide processes and device configurations for accurately determining a device position using the LEO signals. According to embodiments, a device can receive signals from at least two LEO satellite vehicles at block 205. Receiving signals at block 205 can also include receiving estimates of LEO satellite vehicle position by the device transmitted by the LEO satellites.

According to embodiments, a rover may be configured to localize itself using LEO satellite transmissions. A carrier phase differential framework, such as system 100, may be employed for use with a CD-LEO framework. According to embodiments, process 200 may optionally include receiving base observables at clock 206. A base station or base, such as a base stations 110 and 111, may be configured to communicate observables for the one or more LEO satellite signals to a device. By way of example, the device could receive position data (e.g., coordinates) for the base and carrier phase observables determined by the base. The base may be a fixed base, such as base station 110, or a mobile base such as base station 111. The base may also have a known position that is transmitted to the device which may be employed by the differential framework. In the case of a mobile base, global positioning sensors of the base may be used to provide base location information.

According to embodiments, process 200 includes performing one or more operations for carrier phase differential measurement of received signals and to determine position of a receiver, such as rover 105 at block 210. The device may determine a position estimate for the device using carrier phase determinations of the one or more LEO satellite signals received by the device and the observables from the base at block 210. According to embodiments, determining a position estimate includes determining a position estimate for the device in at least one of a stationary and moving state. As described herein, an integer ambiguity result ion algorithm may be performed as one or more operations to resolve ambiguities associated with the device having either a fixed or movable position.

According to embodiments, determining a position estimate includes performing a batch-weighted nonlinear least squares (B-WNLS) operation over a window of steps. For example, when information on the position of the rover is known, a batch weighted nonlinear least-squares (B-WNLS) over a window of K time-steps is employed to solve for the rover's position and ambiguities. Unknown parameters may increase when the device position is not known. A position estimate may also be determined by performing an extended Kalman filter operation to estimate position and velocity of the device from single difference measurements. According to embodiments, carrier phase determinations include differential carrier phase measurements using a simultaneous tracking and navigation framework (STAN) to estimate LEO satellite vehicle states.

Process 200 may include performing one or more corrections at block 215. The position estimate may require correction due to resolve ambiguities associated with the LEO signals.

Figure 5:
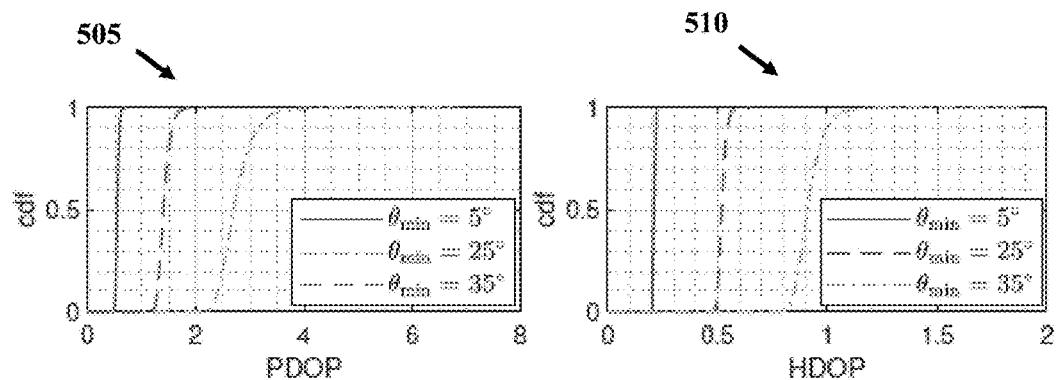
FIG. 5 illustrates cumulative density functions (cdf) of the position and horizontal dilution of precision (PDOP and HDOP, respectively) according to one or more embodiments.

Determinations based on LEO data may require correction of one or more ambiguities due to integer ambiguity and errors in received TLE files. According to one embodiment, correction may include performing one or more operations to characterize the probability density function (pdf) of megaconstellation LEO SV elevation and azimuth angles. These angles may parameterize the integer ambiguity estimation error of a LEO system and the effect of ephemeris errors in the CD-LEO measurements. Knowing the pdf of these angles, the aforementioned errors can be fully characterized. Another performance metric that can be characterized using the derived pdfs are the position dilution of precision (PDOP) and in particular the horizontal dilution of precision (HDOP), which are measures of estimatability of the receiver's position. FIG. 5 illustrates shows the cdf of the PDOP as 505 and HDOP as 510 for a particular receiver position of a LEO megaconstellation evaluated at different elevation masks $\theta_{min}$. Corrections at block 215 may resolve carrier phase integer ambiguities in a batch solver.

Correcting the position estimate by the device may include performing an integer ambiguity resolution operation and double difference carrier phase determination for the one or more LEO satellite signals. Correcting the position estimate can include performing a joint probability density function (pdf) of megaconstellation LEO satellite azimuth and elevation angles to characterize a LEO satellite sources. According to embodiments, correcting the position estimate includes performing a point-solution weighted nonlinear least squares (PS-WNLS) to estimate rover position in real time.

At block 215, at least one navigation observable may be determined using a corrected position. Process 200 may include determining navigation and/or position determinations at block 215 based on corrections of one or more ambiguities. The device may include one or more Doppler frequency measurements for each satellite in process 200. In addition, while operations are described in process 200 as performing a determination or measurement, it should be appreciated that operations of process 200 may be repeated and performed for a period of time. As such, multiple transmissions from LEO satellites may be detected to determine navigation observables including real-time position of the device.

Figure 3:
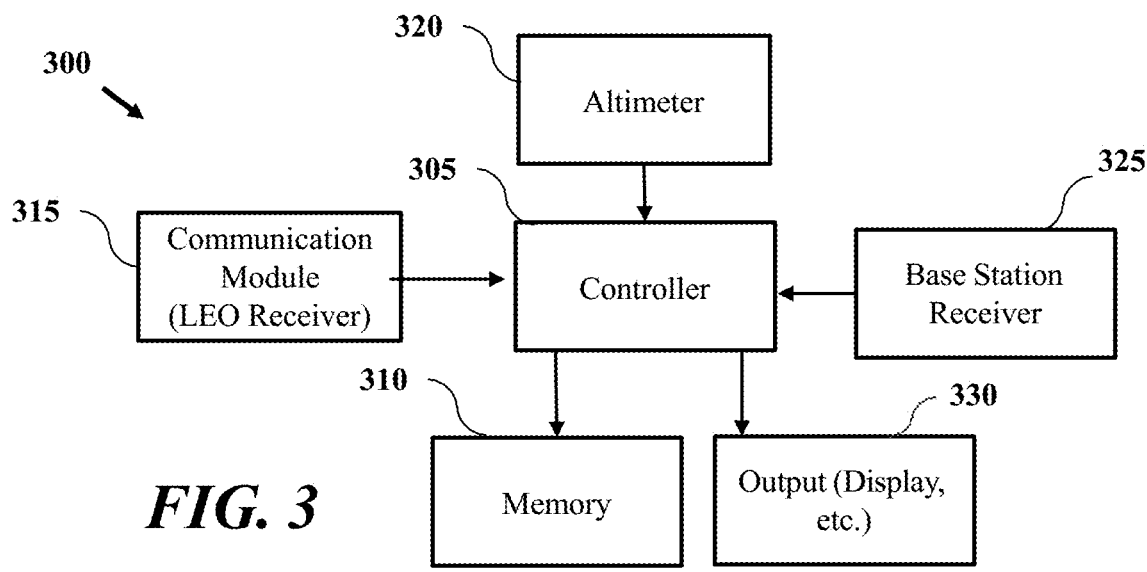
FIG. 3 depicts a device configuration according to one or more embodiments.

FIG. 3 depicts a device configuration according to one or more embodiments. Device 300 may relate to a receiver of a rover (e.g., rover 105) configured to detect LEO satellite transmissions. According to one embodiment, device 300 includes controller 305, memory 310 and communications module 315. Controller 305 may relate to a processor or control device configured to execute one or more operations stored in memory 310, such as a framework for determining position based on measurement of low Earth orbit (LEO) satellite signals. Controller 305 may be coupled to memory 310 and communication module 315. Communication modules 315 may be configured to receive one or more low earth orbit (LEO) satellite signals, including direct quadrature phase shift keying (QPSK) signals. Controller 305 may be configured to correct for integer ambiguity and TLE errors. According to one embodiment, controller 305 is configured to determine a position of the device and correct position data for one or more navigation functions.

Controller 305 maybe part of device 300 configured for navigation using differential carrier phase measurement of low earth orbit (LEO) satellites. Communications module 315 may be a receiver configured to receive one or more low earth orbit (LEO) satellite signals, and to receive observables for the one or more LEO satellite signals from a base. Controller 305 may be configured to determine a position estimate for the device using carrier phase determinations of the one or more LEO satellite signals received by the device and the observables from the base, and correct the position estimate, wherein correcting is based on an integer ambiguity resolution operation and double difference carrier phase determination for the one or more LEO satellite signals. Controller 305 may also be configured to determine at least one navigation observable using a corrected position estimate.

In certain embodiments operations by controller 305 are based on altimeter data received by optional altimeter 320. According to another embodiment, controller 305 may optionally receive base station receiver data at block 325. Device 300 may include optional output 330 to display position data and/or to output position determinations to one or more other devices.

LEO Satellite Position Error

According to one embodiment, systems (e.g., system 100), processes (e.g., process 200) and device configurations may account for position error associated with a satellite or space vehicle (SV).

Embodiments described herein provide solutions for utilizing LEO transmissions. By way of example, $r_{leo_l} \triangleq [x_{leo_l}, y_{leo_l}, z_{leo_l}]^T$ may denote the l-th LEO SV true position vector in the East-North-Up (ENU) frame. If the true LEO SV positions are not known, they may be estimated utilizing TLE files and orbit determination algorithms (e.g., SGP4), resulting with an estimate $\hat{r}_{leo_l}$. The estimation error may be denoted as $$\tilde{r}_{leo_l} \triangleq r_{leo_l} - \hat{r}_{leo_l}.$$

Due to the large ephemeris errors in TLE files, the estimation error $\|\tilde{r}_{leo_l}\|_2$ can be on the order of a few kilometers, with most of the error being in the along-track coordinate. To illustrate this, the position error of 2 Orbcomm LEO SVs (e.g., FM 108 and FM 116), may be calculated by differencing (i) the LEO SVs' position estimate obtained from on-board GPS receivers and broadcasted in the Orbcomm message and (ii) the estimates obtained from TLE files and SGP4 software. The total SV position error magnitude $\|\tilde{r}_{leo_l}\|_2$ for each SV and the along-track SV position error magnitude are shown in FIG. 4.

Figure 4:
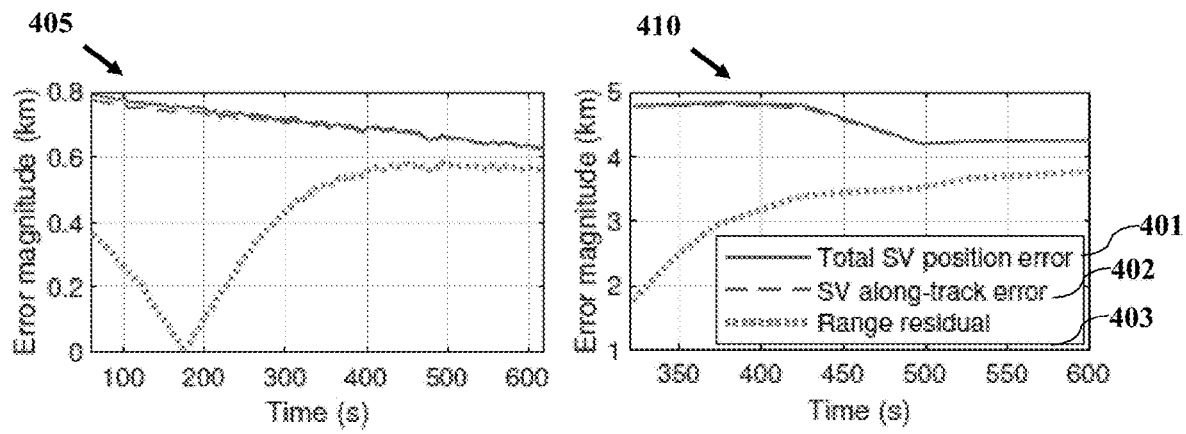
FIG. 4 illustrates satellite vehicle (SV) position error magnitudes according to one or more embodiments.

FIG. 4 illustrates SV position error magnitudes according to one or more embodiments. Total SV position error magnitude 401, along-track SV position error 402 and range residual 403 are shown in FIG. 4 in graphical representation of position error magnitude 405 and graphical representation of position error magnitude 410. Range residual 403, due to ephemeris errors as observed by a terrestrial LEO receiver, is the difference between (i) the true range between the LEO SV and LEO receiver and (ii) the range estimated using the LEO position estimated obtained from TLE files. It can be seen from FIG. 4 that (i) the SV position error can be significant (around 5 km for FM 116), (ii) most of the error is in the along-track direction, and (iii) the range residual is on the order of the SV position error. In order to reduce the effect of ephemeris errors, a navigating vehicle can employ simultaneous tracking and navigation (STAN) framework to estimate the LEO SVs' states simultaneously with the vehicle's states. Alternatively, a reference receiver, or base, may be deployed to provide differential corrections, which will significantly reduce the range residuals. According to one embodiment, this reduction is characterized as a function of the SV elevation and azimuth angles. The sequel describes the carrier phase measurement model and the CD-LEO framework.

LEO Carrier Phase Observation Model

According to one embodiment, configurations and processes described herein are configured for carrier phase measurements from LEO SV signals. For example, a receiver of a rover may be used to obtain carrier phase measurements from Orbcomm LEO SV signals. Note that since LEO satellite orbits are above the ionosphere, their signals will suffer from ionospheric and tropospheric delays. Ionospheric and tropospheric delays may be corrected and carrier phase measurement may be parameterized.

CD-LEO Framework

In order to estimate the rover's position using double difference carrier phase measurements, measurements ambiguities may require correction. For L visible satellites, (L−1) measurements may be obtained, with one unknown ambiguity associated with each double difference measurement. Using only one set of carrier phase measurements with no a priori knowledge on the rover position results in an underdetermined system: (L+2) unknowns (3 position states and (L−1) ambiguities) with only (L−1) measurements. Therefore, when no a priori information on the position of the rover is known, a batch weighted nonlinear least-squares (B-WNLS) over a window of K time-steps is employed to solve for the rover's position and ambiguities. The rover could either remain stationary or move during the batch window. Subsequently, the rover uses measurements collected at different times in a batch estimator, resulting in an overdetermined system. The total number of measurements will be K×(L−1) in the batch window. If the rover remains stationary, the total number of unknowns will remain L+2. Otherwise, the number of unknowns becomes 3K+L−1 (3 position states at each time-step and (L−1) ambiguities. The dimensions of the unknown parameters and the measurement vector set a necessary condition on K and L in order to obtain a solution. Once an estimate of the ambiguities is obtained, the rover position can be estimated in real-time using a point-solution weighted nonlinear least-squares (PS-WNLS) estimator. Both the B-WNLS and PS-WNLS estimate the rover's position from LEO double difference carrier phase measurements.

LEO Double Difference Carrier Phase Observation Model

Embodiments described herein may incorporate and use a LEO double difference carrier phase observation model. According to embodiments, a single difference across receivers may be define adjusted for the base-LEO SV range as $$z_l^{(R,B)}(k) \triangleq z_l^{(R)}(k) - z_l^{(B)}(k) + \|r_{r_B} - \hat{r}_{leo_l}(k)\|_2 = \|r_{r_R} - r_{leo_l}(k)\|_2 +$$
$$c\delta t_r^{(R,B)}(k) + \lambda_l N_l^{(R,B)} + c\tilde{\delta}t_{iono,l}^{(R,B)}(k) + c\tilde{\delta}t_{trop,l}^{(R,B)}(k) - \tilde{r}_{leo_l}^{(B)}(k) + v_l^{(R,B)}(k),$$

where $$\delta t_r^{(R,B)}(k) \triangleq \delta t_{r_R}(k) - \delta t_{r_B}(k),$$
$$\lambda_l N_l^{(R,B)} \triangleq \lambda_l N_l^{(R)} - \lambda_l N_l^{(B)},$$
$$\tilde{\delta}t_{iono,l}^{(R,B)}(k) \triangleq \tilde{\delta}t_{iono,l}^{(R)}(k) - \tilde{\delta}t_{iono,l}^{(B)}(k),$$
$$\tilde{\delta}t_{trop,l}^{(R,B)}(k) \triangleq \tilde{\delta}t_{trop,l}^{(R)}(k) - \tilde{\delta}t_{trop,l}^{(B)}(k),$$
$$\tilde{r}_{leo_l}^{(B)}(k) \triangleq \|r_{r_B} - r_{leo_l}(k)\|_2 - \|r_{r_B} - \hat{r}_{leo_l}(k)\|_2,$$
$$v_l^{(R,B)}(k) \triangleq v_l^{(R)}(k) - v_l^{(B)}(k).$$

It was observed from real data that $\tilde{\delta}t_{iono,l}^{(R,B)}(k)$ and $\tilde{\delta}t_{trop,l}^{(R,B)}(k)$ are negligible for VHF signals. For higher frequency signals, this difference becomes even less significant as ionospheric delays decrease with the square of the carrier frequency. Subsequently, $z_l^{(R,B)}(k)$ is approximated as $$z_l^{(R,B)}(k) \approx h_l^{(R)}(k) + c\delta t_r^{(R,B)}(k) + \lambda_l N_l^{(R,B)} + \tilde{r}_{leo_l}^{(R,B)}(k) + v_l^{(R,B)}(k),$$

where $h_l^{(R)}(k) \triangleq \|r_{r_R} - \hat{r}_{leo_l}(k)\|_2$, $\tilde{r}_{leo_l}^{(R,B)}(k) \triangleq \tilde{r}_{leo_l}^{(R)}(k) - \tilde{r}_{leo_l}^{(B)}(k)$, and $\tilde{r}_{leo_l}^{(R)}(k) \triangleq \|r_{r_R} - r_{leo_l}(k)\|_2 - \|r_{r_R} - \hat{r}_{leo_l}(k)\|_2$ In vector form, the measurement equation becomes $$z(k) \triangleq h_R(k) + c\delta t_r^{(R,B)}(k) 1_L + A + \tilde{r}_{leo}^{(R,B)}(k) + v(k),$$

where $1_L$ is an L×1 vector of ones and $$z(k) \triangleq \left[z_1^{(R,B)}(k), \ldots, z_L^{(R,B)}(k)\right]^T$$
$$h_R(k) \triangleq \left[h_1^{(R)}(k), \ldots, h_L^{(R)}(k)\right]^T$$
$$A \triangleq \left[\lambda_1 N_1^{(R,B)}, \ldots, \lambda_L N_L^{(R,B)}\right]^T$$
$$\tilde{r}_{leo}^{(R,B)}(k) \triangleq \left[\tilde{r}_{leo_1}^{(R,B)}(k), \ldots, \tilde{r}_{leo_L}^{(R,B)}(k)\right]^T$$
$$v(k) \triangleq \left[v_1^{(R,B)}(k), \ldots, v_L^{(R,B)}(k)\right]^T.$$

The covariance of the matrix of v(k) is given by $$R(k) \triangleq \text{diag}\left[\left[\sigma_1^{(R,B)}(k)\right]^2, \ldots, \left[\sigma_L^{(R,B)}(k)\right]^2\right],$$

where $$\left[\sigma_l^{(R,B)}(k)\right]^2 \triangleq \left[\sigma_l^{(R)}(k)\right]^2 + \left[\sigma_l^{(B)}(k)\right]^2.$$

Next the double difference measurements are obtained. Without loss of generality the first LEO SV is taken as the reference, yielding the double difference measurements $$\bar{z}(k) \triangleq Tz(k) = \bar{h}_R(k) + \bar{A} + \tilde{\bar{r}}_{leo}^{(R,B)}(k) + \bar{v}(k),$$

where $\bar{h}_R(k) \triangleq Th_R(k)$, $\bar{A} \triangleq TA$, $\bar{r}_{leo}^{(R,B)}(k) \triangleq T\tilde{r}_{leo}^{(R,B)}(k)$, $\bar{v}(k) \triangleq Tv(k)$, and $T \triangleq [-1_{L-1}\ I_{(L-1)\times(L-1)}]$ is the differencing matrix. Note that the covariance matrix of $\bar{v}(k)$ is given by $\bar{R}(k) = TR(k)T^T$. If $\lambda_l$ is not equal to $\lambda_1$, then $\bar{A}$ cannot be expressed as $\lambda N$, where N is a vector of integers.

If $\lambda_l = \lambda$, $\forall l$, then $\bar{A} = \lambda N$ and the integer ambiguity resolution algorithm described herein is used to solve the integers.

B-WNLS Solution

If the rover remains stationary during a batch window, then the parameter to be estimated is given by $$x_{stationary} \triangleq [r_{r_R}^T(0), \bar{A}^T]^T,$$

otherwise it is given by $$x_{mobile} \triangleq [r_{r_R}^T(0), \ldots, r_{r_R}^T(K-1), \bar{A}^T]^T.$$

The parameters for $x_{stationary}$ and $x_{mobile}$ may be estimated from a collection of measurements from 0 to (K−1) given by $$z^K \triangleq [z^T(0), \ldots, z^T(K-1)]^T$$

to yield an estimate of $\tilde{x}_{stationary}$ and $\tilde{x}_{mobile}$ respectively. A geometry matrix may be used to at time steps (e.g., k) which can be parametrized by a satellite vehicle azimuth and elevation angles. Estimates of integers and associated estimation error covariance may be obtained.

PS-WNLS Solution

After resolving the ambiguities, a point solution for the rover position can be computed at each time-step. Let $\check{N}$ denote the integer estimates of N. The double difference measurement vector adjusted for the integer ambiguities is hence expressed as $$\bar{z}_f(k) \triangleq \bar{z}(k) - \lambda\check{N} = \bar{h}_R(k) + \lambda\tilde{N} + \bar{r}_{leo}^{(R,B)}(k) + \bar{v}(k),$$

where $\tilde{N} \triangleq N - \check{N}$ is the integer ambiguity error. The rover uses $\bar{z}_f(k)$ to solve for $r_{r_R}(k)$ in a PS-WNLS. For small measurement noise variances, which is the case for high frequency carriers, the positioning performance heavily depends on $\bar{r}_{leo}^{(R,B)}(k)$.

Reduced-Sized Integer Least Squares Algorithm

When the proposed LEO constellations are fully deployed, hundreds of LEO satellites will be visible from almost anywhere on Earth. Dozens of satellites will be visible. For such number of satellites, it is impractical to solve the ILS, as its complexity grows exponentially with the number of integer ambiguities. One embodiment is directed to integer ambiguity resolution algorithm, referred to as reduced-size ILS, which approaches the performance of the Least-squares Ambiguity Decorrelation Adjustment (LAMBDA) method, but with a significantly smaller fraction of the LAMBDA method's complexity. The reduced-size ILS relies on the tradeoff between complexity and performance. That is, for every integer, a test is formulated to determine whether the Integer Rounding (IR) method, which has negligible complexity, is a good estimate of the corresponding integer, or whether the integer must be estimated using an ILS.

The test is of the form $$[\bar{Q}_N]_{ll} \overset{?}{\leq} \frac{1}{\mu^2}\eta,$$

where $[\bar{Q}_N]_{ll}$ is the l-th diagonal element of $\bar{Q}_N$ after decorrelation. An integer is considered effective if it satisfies the test. A set of reliable integers may be defined, and one or more operations are performed to reduce the integer set.

Joint Distribution of Megaconstellation LEO SV's Azimuth and Elevation Angles

According to one embodiment, a joint pdf of megaconstellation LEO SVs' azimuth and elevation angles is determined. This pdf offers an efficient way to characterize the performance of the CD-LEO framework as well as to enable performance-driven design of the CD-LEO framework, such as the differential baseline and the B-WNLS batch window. A joint pdf may be determined for an LEO megaconstellation.

Probability Density Function (pdf)

According to one embodiment, systems (e.g., system 100), processes (e.g., process 200) and device configurations may determine probability density functions (pdfs) of megaconstellation LEO satellites' azimuth and elevation angles. The pdf determinations may efficiently characterize the performance of LEO satellite-based navigation. In one embodiment, performance of a CD-LEO framework is characterized using pdfs by analyzing (i) the position dilution of precision (PDOP) of megaconstellation LEO satellites, (ii) the measurement residuals due to ephemeris errors, and (iii) the measurement residuals due to integer ambiguity estimation errors as a function of the system design parameters, more precisely, the differential baseline and the batch size. According to one embodiment, pdf determinations allow system parameters and configurations to guarantee a desired performance. Experimental results are presented below showing an unmanned aerial vehicle (UAV) localizing itself with real LEO satellite signals using differential carrier phase measurements to an acceptable level of accuracy.

Performance Characterization and Performance Driven CD-LEO Framework

The PDOP, shows a methodology to obtain the optimal threshold for the proposed reduced-ILS method, and characterizes the measurement error in the PSWNLS due to satellite position errors.

PDOP Characterization

FIG. 5 illustrates cumulative density functions (cdf) according to one or more embodiments. One important measure of the estimability (i.e., degree of observability) of the receiver's position is the PDOP. Assuming equal measurement noise variances, the PDOP in the CD-LEO framework is given by PDOP=trace [P], where P is the PDOP matrix given by $$P = 2[H^T T^T (TT^T)^{-1} TH]^{-1}$$

Another metric of interest is the horizontal dilution of precision (HDOP), which gives a measure of the estimatability of the horizontal components of the position vector. This metric is appropriate to study in the case where the rover is equipped with an altimeter and is using LEO signals mainly to estimate its horizontal position. The HDOP is calculated according to PDOP=$\sqrt{\text{trace}[P2\times2]}$ where $P_{2\times2}$ indicates the 2×2 block of the PDOP matrix corresponding to the horizontal position coordinates. The vertical dilution of precision (VDOP) becomes an important metric to study as well. The VDOP may be given as VDOP=$\sqrt{P3\times3}$ where $P_{3\times 3}$ is the diagonal element of P, corresponding to the vertical position coordinate. The PDOP, HDOP and VDOP cumulative density functions (cdfs) are characterized numerically using the pdfs of the SV azimuth and elevation angles. The cdfs, shown in FIG. 5 are computed for a receiver in Irvine, CA, U.S.A., and for three elevation angle masks: 5°, 25°, and 35°.

FIG. 5 shows that the PDOP is mostly less than 2 for elevation angle masks of 25° or below, and above 2 almost all the time for elevation angle masks of 35°. This is mainly due to the fact that the vertical component becomes poorly observable for such elevation angle masks. This is validated in the HDOP cdf, which shows that the HDOP is almost always below unity for elevation masks of 35° or below. In fact, the HDOP is mostly below 0.6 for elevation angles of 25°, showing that highly accurate horizontal positioning may be achieved.

Embodiments described herein provide models and performance characterizations that inform the design of CD-LEO frameworks, and in particular to baseline selection. The disclosure provides evaluations of cdf and statistics of the PDOP, followed by the statistics and cdfs of the CD-LEO measurement residual errors due to ephemeris errors and atmospheric effects. The following analysis is concerned with the single-epoch position estimation performance after the integer ambiguities have been resolved, i.e., for the PS-WNLS. The performance characterization is conducted using a Monte Carlo approach: several realizations of the elevation and azimuth angles are obtained from the joint pdf discussed herein and the cdf or statistics of the performance metric are computed numerically.

Figure 6:
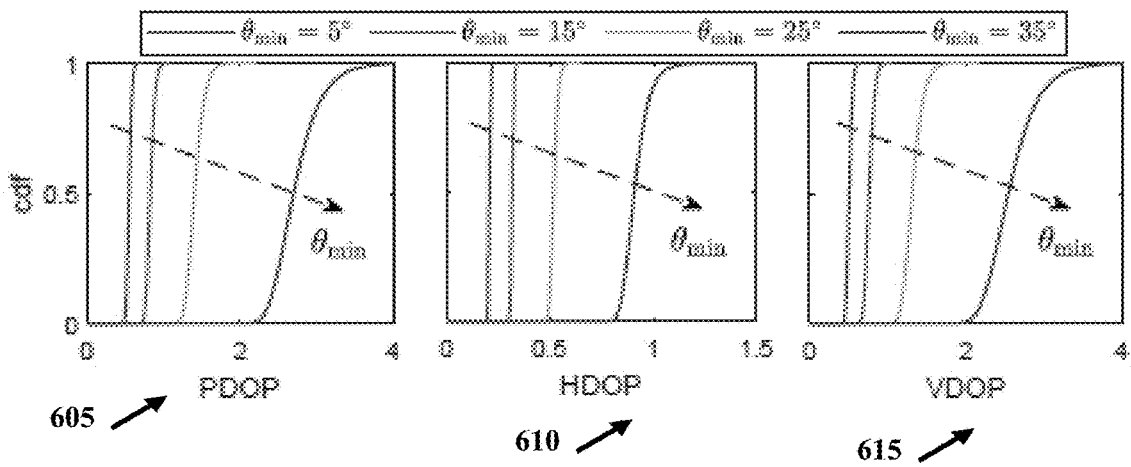
FIG. 6 illustrates cumulative density functions (cdf) of the position, horizontal and vertical dilution of precision (PDOP, HDOP, and VDOP, respectively) according to one or more embodiments.
Figure 7:
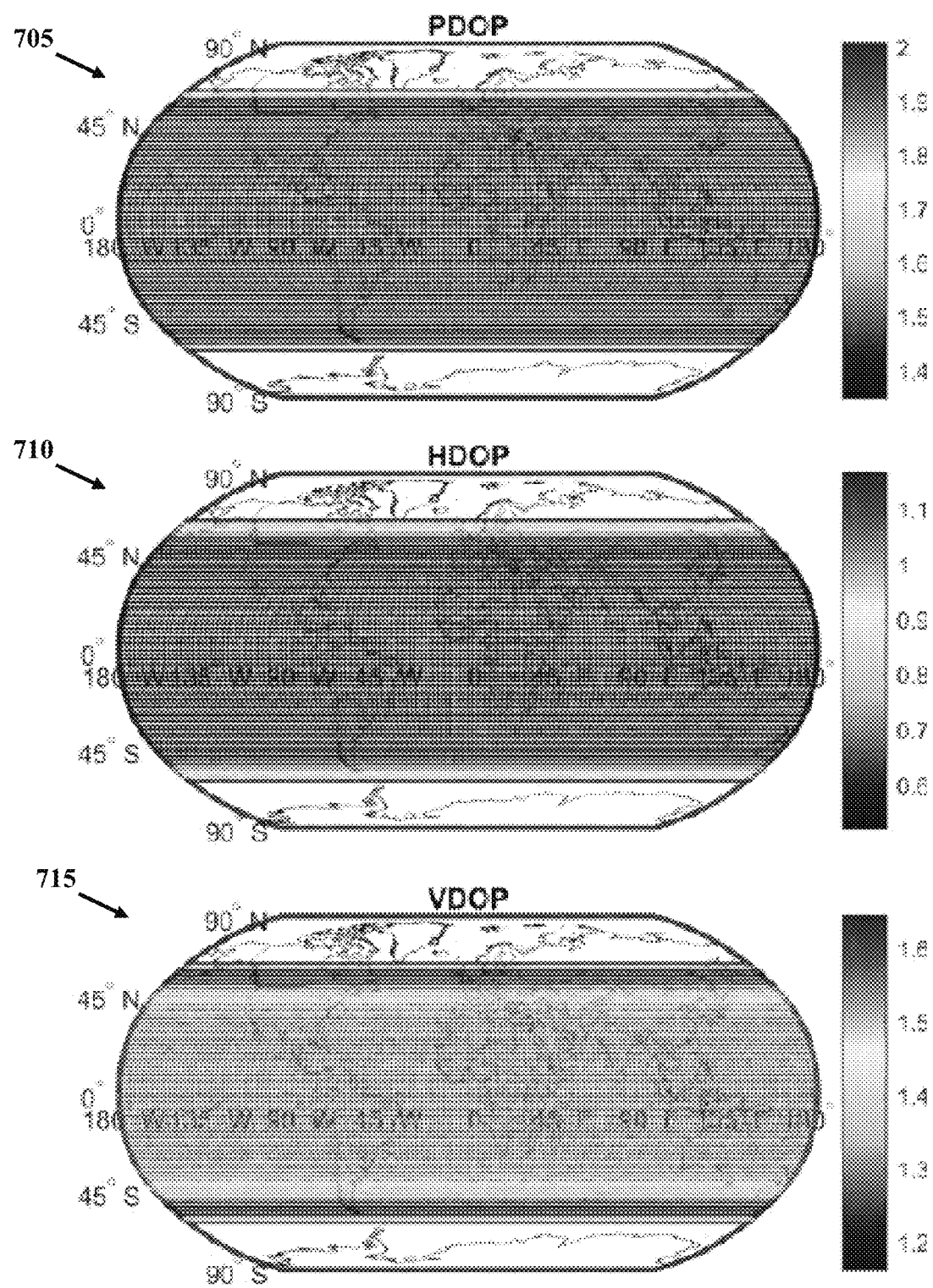
FIG. 7 illustrates heat maps of the average PDOP, HDOP, and VDOP for a CDLEO navigation framework according to one or more embodiments.

The cdfs, shown in FIG. 6 are computed for a receiver in Irvine, CA, U.S.A., and for four elevation angle masks: 5°, 15°, 25°, and 35°. In FIG. 6, dashed arrows indicate the direction of the curves when the elevation mask angle $\theta_{min}$ increases. The cdfs were computed from 105 PDOP, HDOP, and VDOP realizations. FIG. 6 shows that the PDOP 605 is mostly less than 2 for elevation angle masks of 25° or below, and above 2 almost all the time for elevation angle masks of 35°. This is mainly due to the fact that the vertical component becomes poorly observable for such elevation angle masks. This is validated in the HDOP cdf, which shows that the HDOP 610 is almost always below unity for elevation masks of 35° or below. In fact, the HDOP 610 is mostly below 0.6 for elevation angles of 25°, showing that highly accurate horizontal positioning may be achieved. Moreover, heat maps showing the average PDOP, HDOP, and VDOP were computed in FIG. 7. The heat maps were computed from 103 PDOP, HDOP, and VDOP realizations. As shown in FIG. 7, the average DOP is less than 1.5 for all latitudes between −40° and 40°.

Measurement Error Statistics Characterization

Figure 8A:
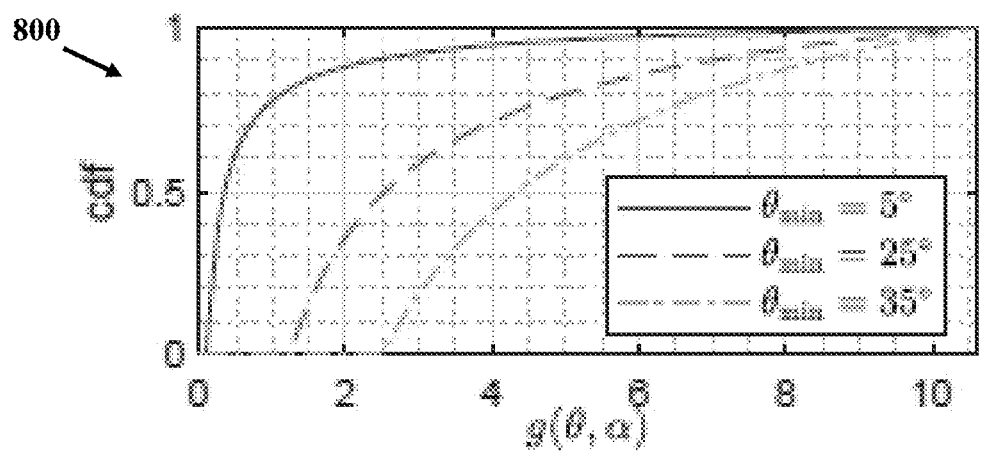
FIGS. 8A-8B illustrate cumulative density functions for elevation mask angles according to one or more embodiments.
Figure 8B:
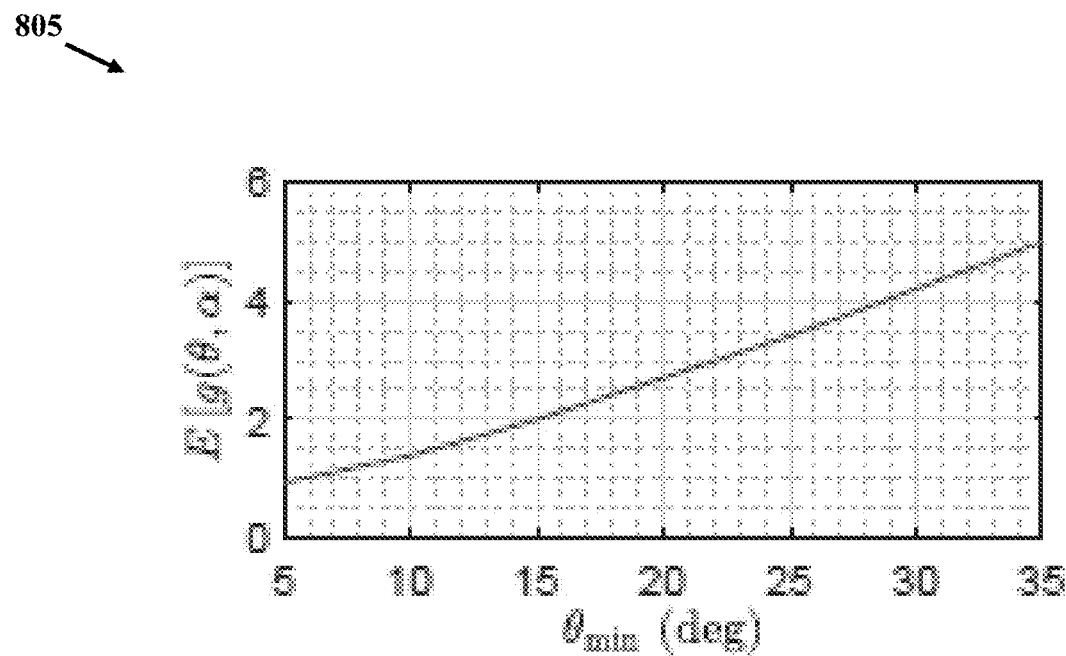

Ephemeris Errors: Subsequently, the cdf of $|\tilde{r}_{leo_l}^{(R,B)}|$ can be characterized and the joint distribution of the LEO SVs' azimuth and elevation angles derived. To this end, the cdf of g (θ, α) is calculated for the Starlink LEO constellation. The receiver was assumed to be on the UCI campus. The cdf 800 was computed for three elevation masks: $\theta_{min}$=5°, $\theta_{min}$=25°, and $\theta_{min}$=35°. The cdf of g (θ, α), is shown in FIG. 8A, and the expected value of g (θ, α), denoted by $\mathbb{E}$ g (θ, α) is shown as 805 in FIG. 8B as a function of $\theta_{min}$.

Figure 9A:
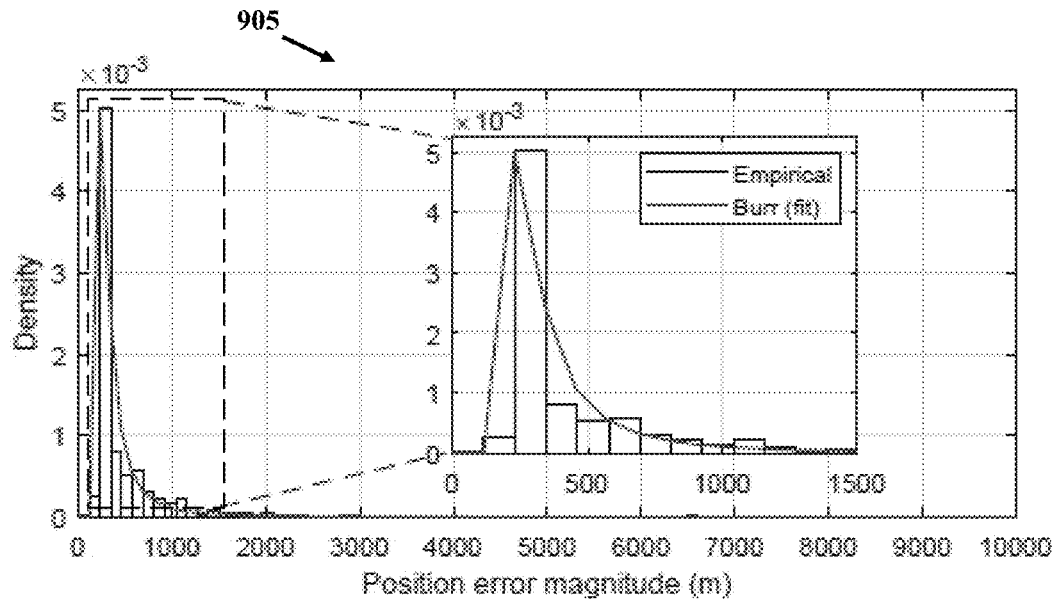
FIG. 9A illustrates a histogram of satellite vehicle position MRSE.

To better characterize the effect of ephemeris errors on CD-LEO measurements, the residuals are computed for a given distribution of the SV position error. The distribution of the SV position error was obtained from published root mean squared error (RMSE) data by Celestrack for current Starlink SVs, which represent the SV position RMSE at the TLE epoch. A histogram of the SV position RMSE as well as a pdf fit are shown as 905 in FIG. 9A. It was found that the Burr distribution best fit the RMSE data. It is assumed that the SV position error is independent of the SV azimuth and elevation angles; hence, it is sampled independently from the Burr distribution fit.

Figure 9B:
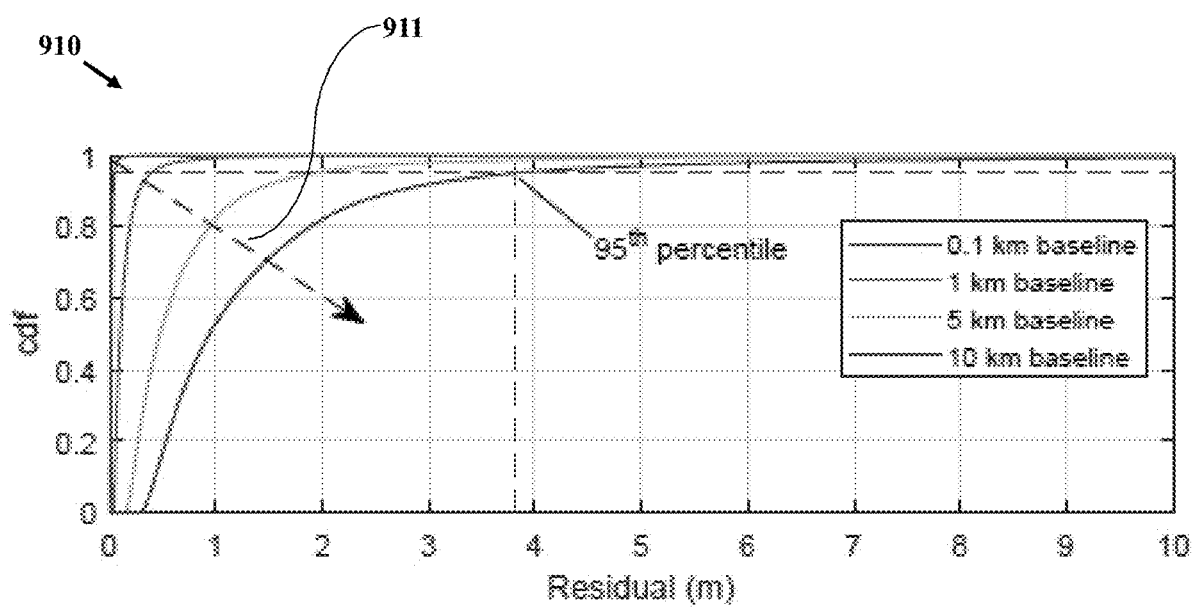
FIG. 9B illustrates cumulative density functions for elevation mask angles according to one or more embodiments according to one or more embodiments.

FIG. 9B illustrates the cdf 910 of the residual for $\theta_{min}$=25° and for different values of the baseline. The SV position errors were drawn from the Burr distribution described above. The receiver was assumed to be on the UCI campus. The black arrow 911 indicates the direction in which the baseline increases. It can be seen from FIG. 9B that the 95th percentile for a 10 km baseline is 3.8 m, which indicates that the residual $95^{th}$ percentile is lower than 3.8 m for all baselines less than 10 km.

Figure 9C:
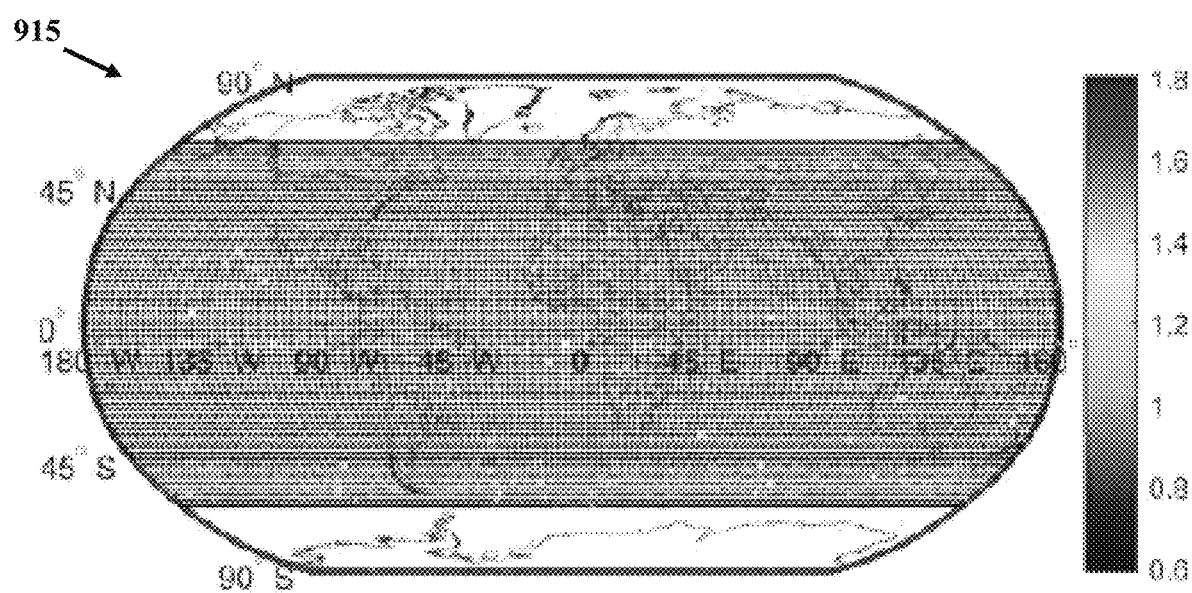
FIG. 9C illustrates a heat map pf average residual error in CD-LEO measurements according to one or more embodiments according to one or more embodiments.

A heat map of the average residual error is then computed for a baseline of 5 km and shown in FIG. 9C. The heat map 915 shows that the average residual error in the CD-LEO measurements due to SV position error is less than 2 m almost anywhere between −60° and 60° latitudes. The heat map was computed from 104 residual realizations.

Atmospheric Effects: Since the $z\hat{\delta}t_{iono,l}^{(i)}$, z, $w\hat{\delta}t_{iono,l}^{(i)}$, and z, $d\hat{\delta}t_{trop,l}^{(i)}$, are also functions of several unknown parameters such as carrier frequency, TECV, atmospheric pressure, temperature, etc., the effect of ionospheric and tropospheric delays on CD-LEO measurements will be characterized through the mapping functions derived as $$\tilde{f}_{iono}(\theta) \triangleq |_{d\theta}{}^d f_{iono}(\theta)\Delta\theta_{max}|$$

$$\tilde{f}_{trop,w}(\theta) \triangleq |_{d\theta}{}^d f_{trop,w}(\theta)\Delta\theta_{max}|$$

$$\tilde{f}_{trop,d}(\theta) \triangleq |_{d\theta}{}^d f_{trop,d}(\theta)\Delta\theta_{max}|$$

Figure 10:
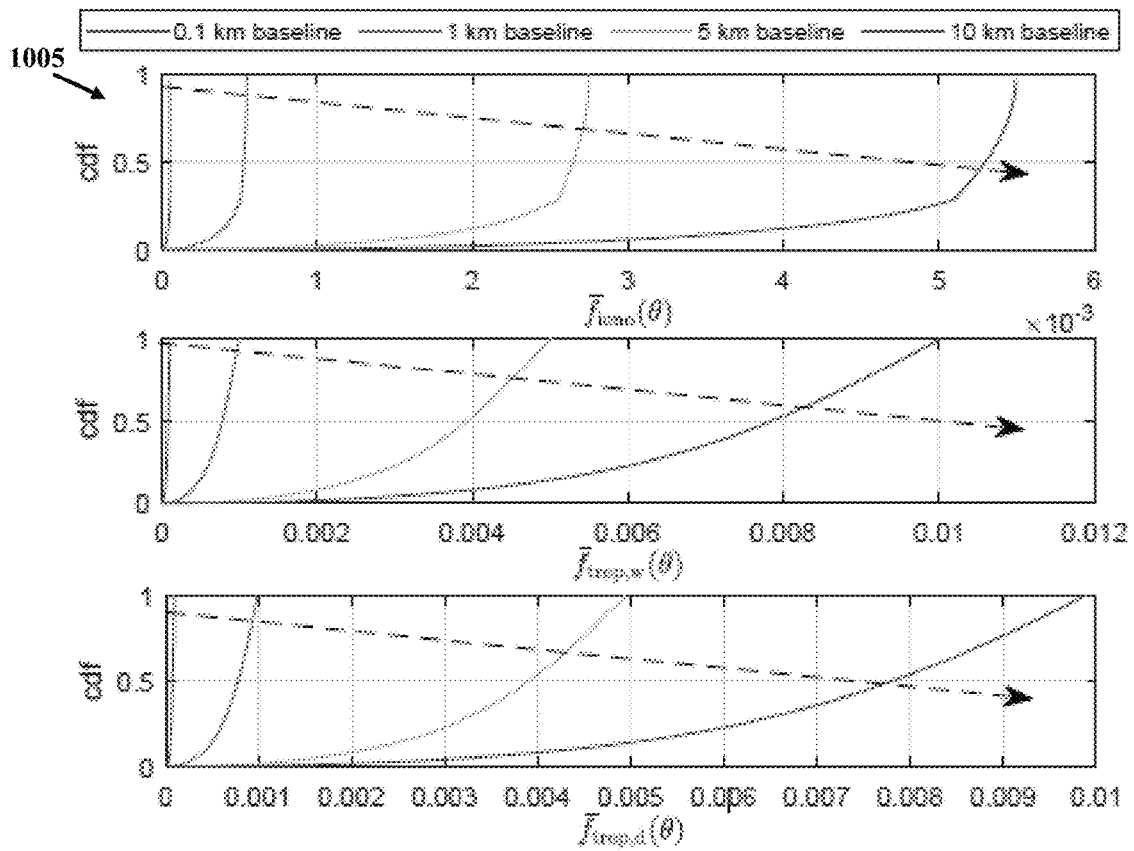
FIG. 10 illustrates cumulative density functions of the ionospheric and tropospheric delay mapping functions according to one or more embodiments.
Figure 11:
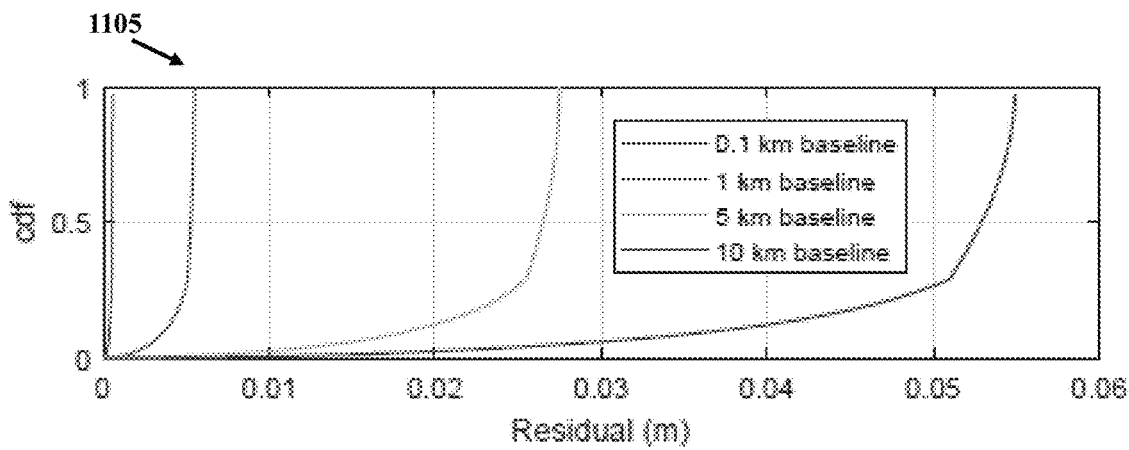
FIG. 11 illustrates cumulative density functions of residual error according to one or more embodiments.

The cdf 1005 of $\tilde{f}_{iono}(\theta)$, $\tilde{f}_{trop,w}(\theta)$, and $\tilde{f}_{trop,d}(\theta)$ are shown in FIG. 10. The dashed arrows indicate the direction of the curves when the baseline increases. The cdf was computed from 105 realizations. The cdf of the residuals can be computed knowing the ionospheric and wet and dry tropospheric delays by simply multiplying them by the corresponding mapping functions. For example, FIG. 11 shows the cdf 1105 of the residual CD-LEO measurement error due to ionospheric delays for an ionospheric delay of 10 m at zenith.

Figure 12:
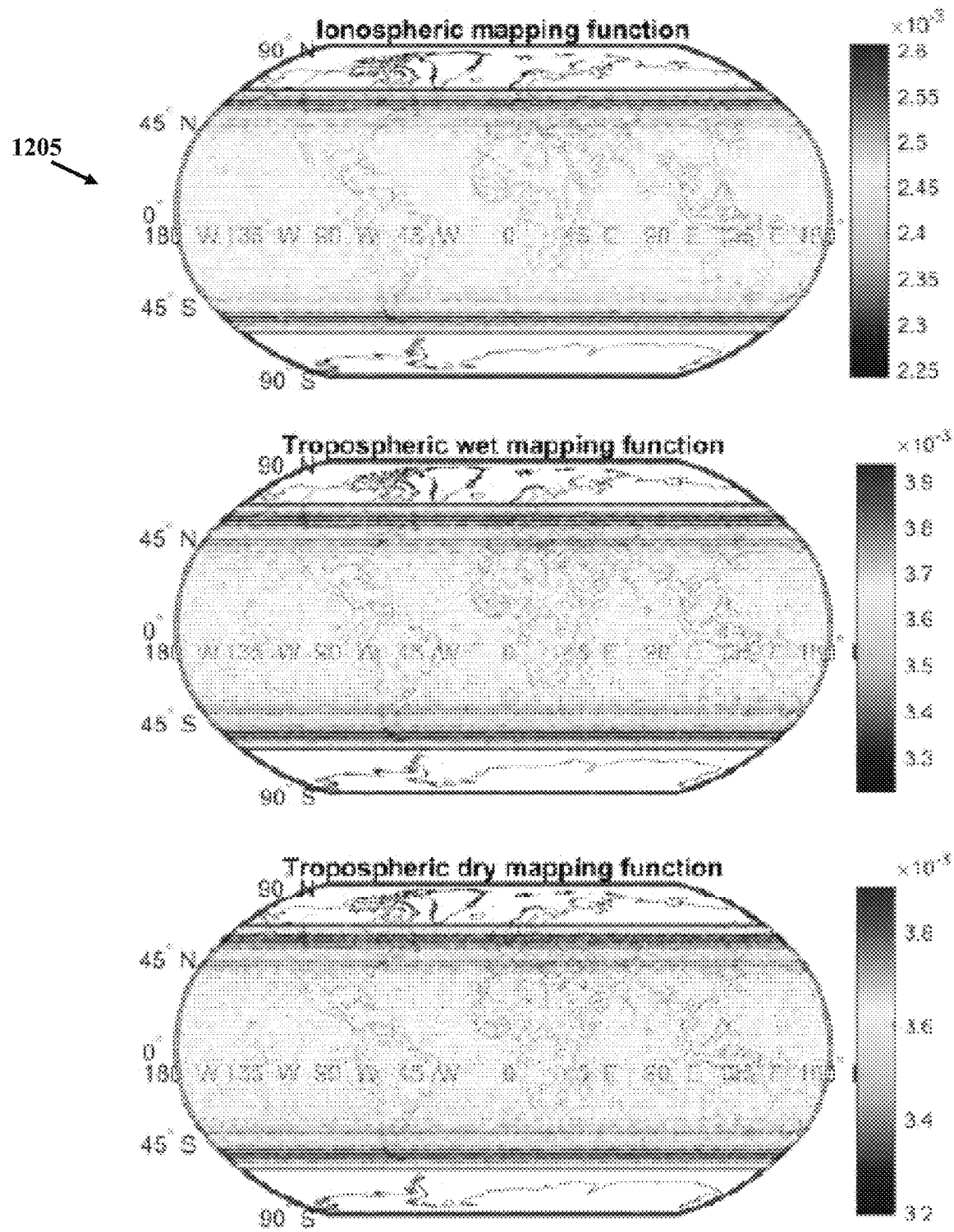
FIG. 12 illustrates heat maps according to one or more embodiments.

Heat maps of the average ionospheric and tropospheric delay mapping functions are then computed for a baseline of 5 km and shown as 1205 in FIG. 12. The heat maps 1205 show that the average residual in the CD-LEO measurements due to ionospheric delays is less than 4 mm per meters of zenith ionospheric delay almost anywhere between −60° and 60° latitudes.

Figure 13A:
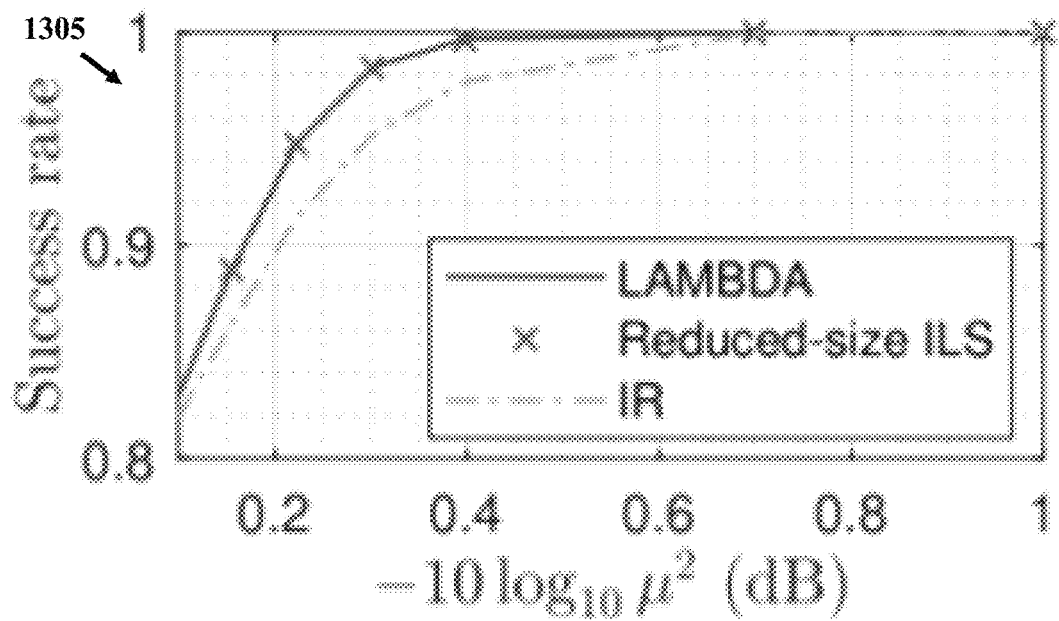
FIGS. 13A-13B illustrate success rates for integer ambiguity resolutions according to one or more embodiments.
Figure 13B:
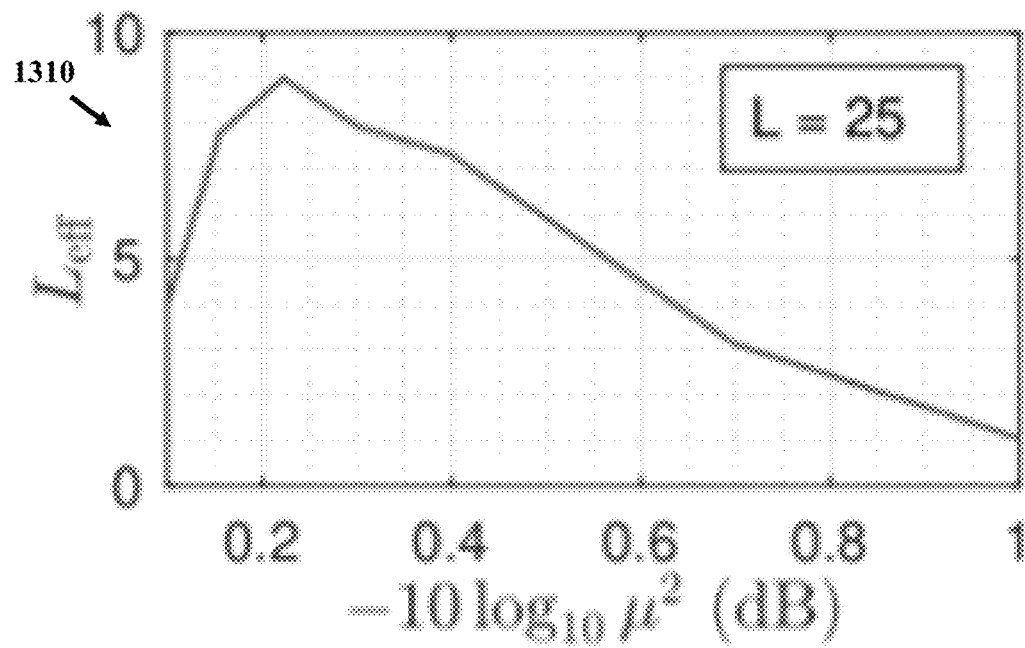

FIG. 13A illustrates the success rate of a LAMBDA method, IR, and proposed reduced size ILS method with a numerically computed threshold as 1305. FIG. 13B illustrates the effective number of integers to solve for the reduced sized ILS as 1310.

The ILS employed relies on comparing the estimation error variance of the float solution of a certain integer μ2 to an unknown threshold η. The pdfs of the SV elevation and azimuth angles of the SVs can be used to derive the optimal threshold. Once the optimal threshold is known, the reduced-size ILS used in this work performs as well as the well-known LAMBDA method as shown in FIG. 13A, with a fraction of the complexity of LAMBDA, as shown in FIG. 13B (L is the size of the LAMBDA ILS and Leff is the size of the reduced-size ILS with the optimal threshold selected using the derived pdfs). The integer rounding (IR) method is also shown in FIG. 13A for comparison.

SV positions may be obtained by non-precise ephemerides. The effect of the estimated SV position error onto the CD-LEO measurement is first characterized as a function of the SV elevation angle. The pdf of the elevation angle is used to obtain the cdf of the measurement error due to ephemeris errors.

It is shown that the magnitude of the CD-LEO measurement errors due to ephemeris errors is bounded by $$\text{measurement error} \leq \lceil g(\theta,\alpha) \rceil \beta,$$

where $\beta$ is a term related to the baseline and the LEO SV position error, $\theta$ is the SV's elevation angle, / is the normalized orbital radius (assuming circular orbit), and g is given by $$g(\theta, \alpha) = \frac{\sin\theta\cos\theta\sqrt{\alpha^2 - \cos^2\theta}}{\alpha^2 \sin\left[\cos^{-1}\left(\frac{\cos\theta}{\alpha}\right) - \theta\right]}.$$

Figure 14A:
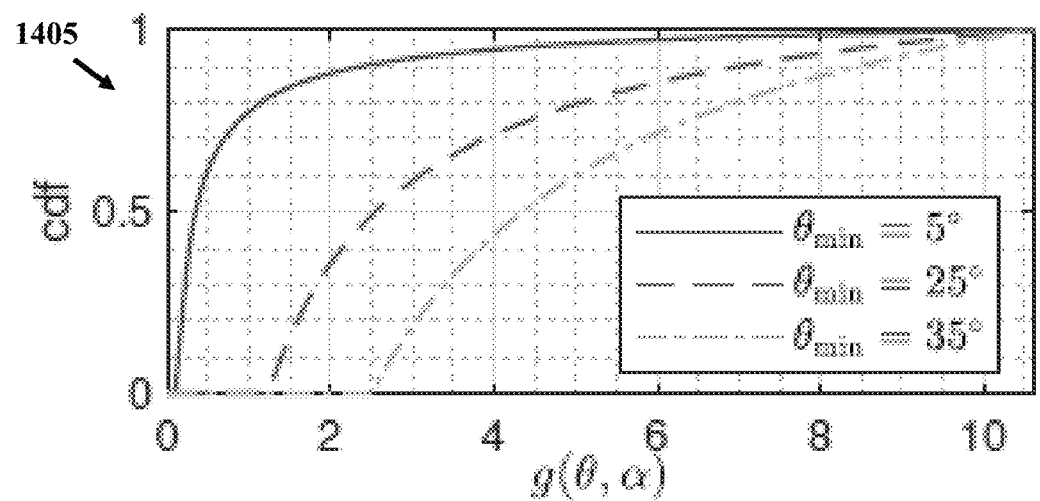
FIGS. 14A-14B illustrate cumulative density functions (cdf) of the mapping function g and its expected value according to one or more embodiments.
Figure 14B:
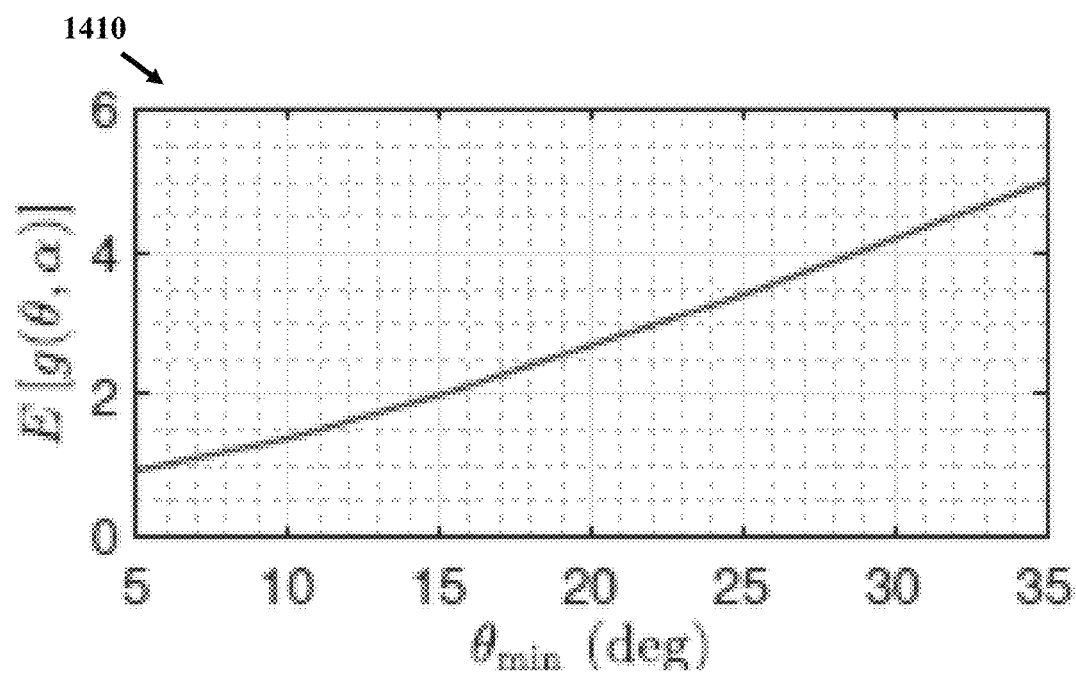

The function g determines how the SV position errors map into the CD-LEO measurement errors; hence, it is important to characterize. FIG. 14A shows the cdf of g calculated from the pdf of the elevation angle for different elevation masks as 1405, and FIG. 14B shows the expected value of g as a function of the elevation mask as 1410.

Figure 15:
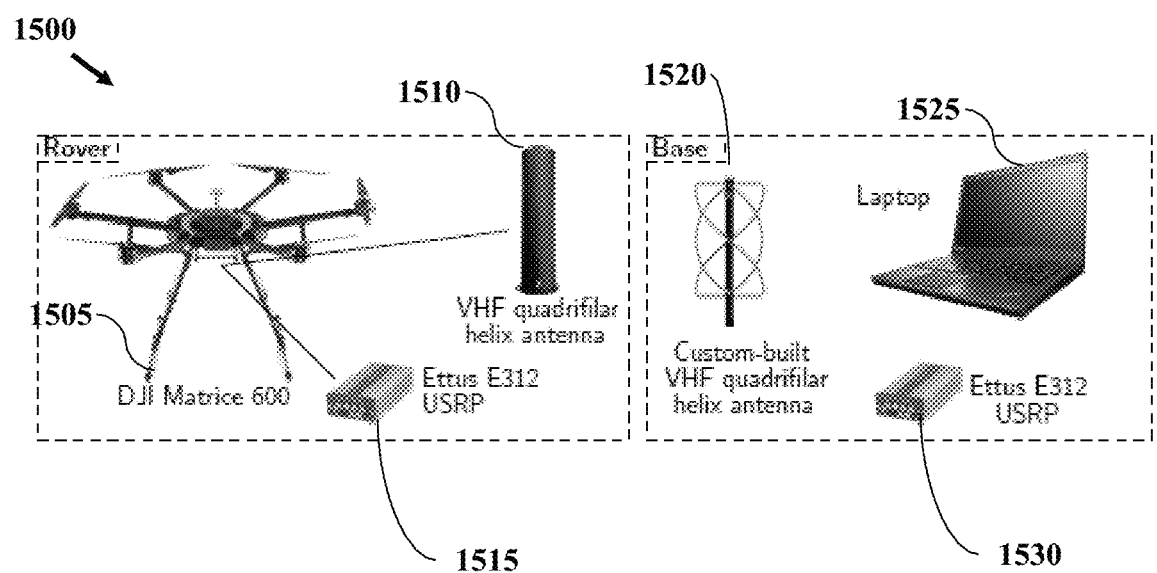
FIG. 15 illustrates an experimental device setup according to one or more embodiments
Figure 17:
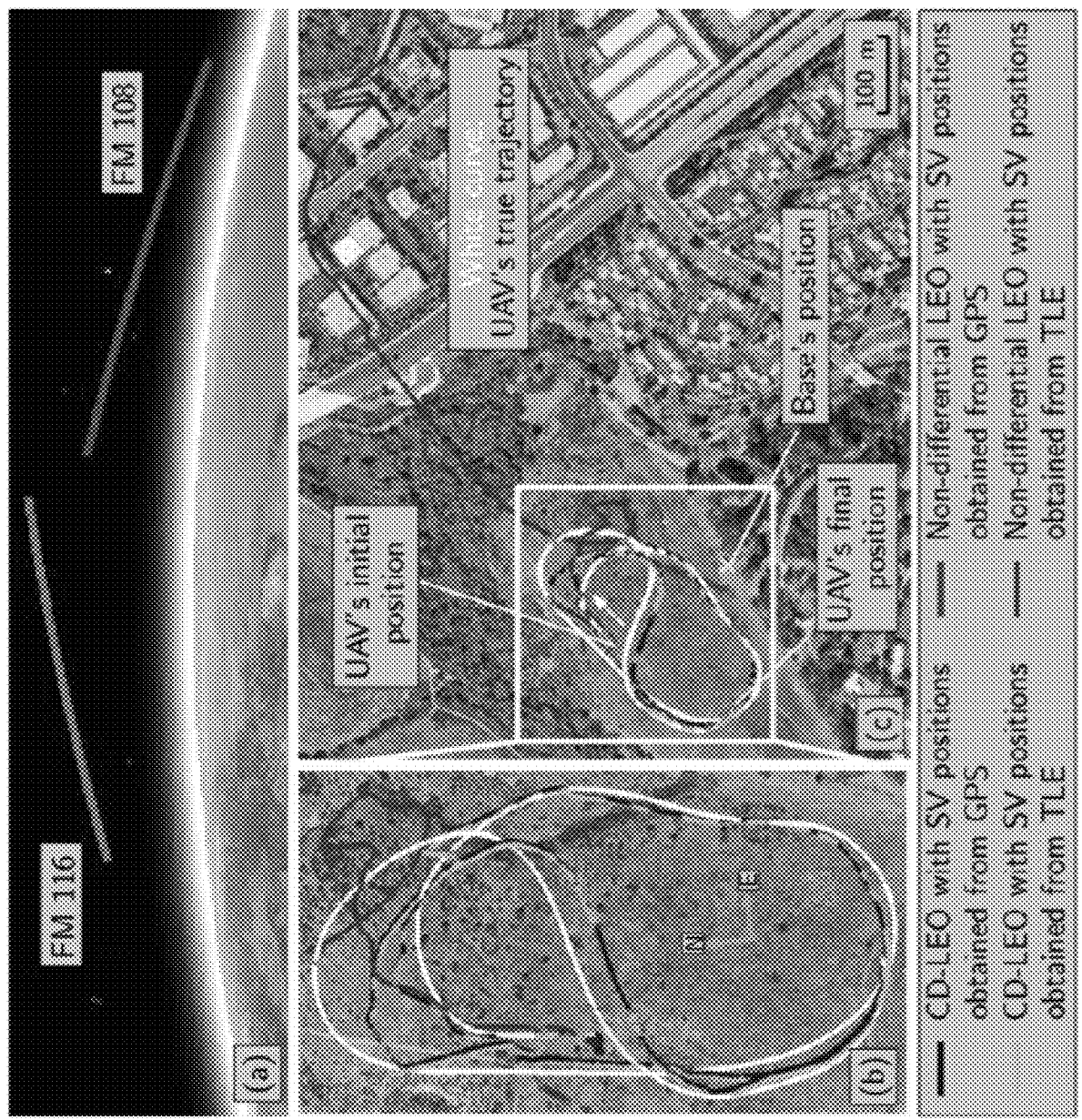
FIG. 17 depicts a graphical representation of a real trajectory according to one or more embodiments.

FIG. 15 illustrates devices of an experimental setup according to one or more embodiments. According to one embodiment, configuration 1500 includes rover 1500, universal software radio device (USRP) 1515, and VHF antenna 1510. Base 1520 included a VHF antenna, computing device 825 and USRP 1530. The rover 1505 and base 1520 each included a small consumer-grade GPS antenna to discipline the onboard oscillator. According to the experimental setup, receivers were tuned to a 137 MHz carrier frequency with 2.4 MHz sampling bandwidth, which covers the 137-138 MHz band allocated to Orbcomm SVs. Samples of the received signals were stored for off-line post-processing using a software-defined radio (SDR). The LEO carrierphase measurements were produced at a rate of 4.8 kHz and were down-sampled to 10 Hz. The base's position was surveyed on Google Earth, and the UAV trajectory was taken from its onboard navigation system. Rover 1505 and base 1520 are representative of components that may employ and utilize processes and the framework described herein. Over the course of the experiment, the receivers on-board the base and the UAV were listening to 2 Orbcomm SVs, namely FM 108 and FM 116. The SVs transmit their position as estimated by their on-board GPS receivers. These positions were decoded and used as ground-truth. A position estimate of FM 108 and FM 116 was also obtained from TLE files and SGP4 software. The satellites were simultaneously visible for 2 minutes. FIG. 17 shows the SV trajectories.

Figure 16:
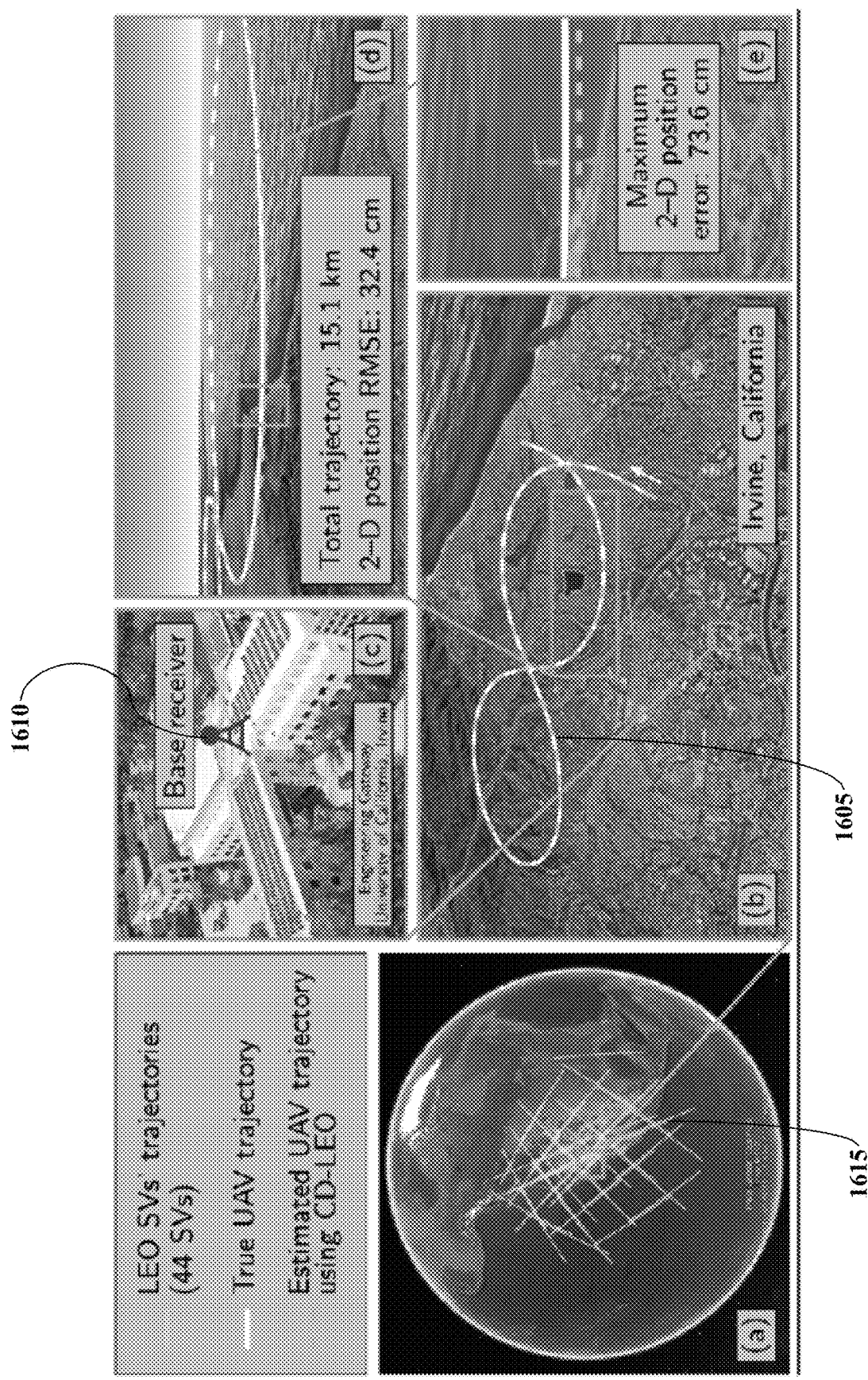
FIG. 16 depicts a graphical representation of a simulated trajectory according to one or more embodiments.

FIG. 16 depicts a graphical representation of trajectory associated with an experiment according to one or more embodiments.

According to one embodiment, a rover/base of an experimental setup of the CD-LEO framework included a fixed-wing UAV navigating with signals from a Starlink LEO SV megaconstellation under the CD-LEO framework. The UAV, representing the rover, flew a total trajectory of 15.1 km in 300 seconds over Irvine, California. The simulated UAV compares in performance to a small private plane with a cruise speed of roughly 50 m/s. The trajectory of the UAV, shown as 1605 in FIG. 16 included of a straight segment, followed by a figure-eight pattern over the University of California, Irvine, and then a final straight segment. The UAV flew at a constant altitude of 2.5 km, while executing the rolling and yawing maneuvers. A stationary base, shown as 1610 in FIG. 16, was located on top of the Engineering Gateway at the University of California, Irvine campus, where the ASPIN Laboratory is located. The distance between the base and the UAV throughout the UAV's trajectory ranged between a maximum of 3.826 km to a minimum of 2.489 km.

The elevation angle mask was set to 15° in both receivers. The UAV and base station both received signals from 44 simulated LEO SVs, whose trajectories are depicted as 1615 in FIG. 16. To simulate ephemeris errors, the true anomaly of each satellite was randomly shifted such that the satellite position errors were distributed between 75 m and 3.5 km. It was assumed that the UAV had access to GNSS for the first 50 seconds, during which the B-WNLS is solved. After 50 seconds, the UAV solves for its 3-D position using CD-LEO measurements and the integer ambiguities estimates obtained by solving the B-WNLS. The total 3-D position RMSE was 2.2 m and the total 2-D RMSE was 32.4 cm.

The simulation layout and the true and estimated UAV trajectories are shown in FIG. 16. Note that similar to GNSS, the vertical uncertainty in the CD-LEO framework is larger than the horizontal uncertainty due to less geometric diversity in the vertical direction.

The experiment's rover was a DJI Matrice 600 UAV equipped with an Ettus E312 universal software radio peripheral (USRP), a high-end VHF antenna, and a small consumer-grade GPS antenna to discipline the onboard oscillator. The base was a stationary receiver equipped with an Ettus E312.

FIG. 17 depicts a graphical representation of trajectory according to one or more embodiments. The UAV traversed a total trajectory of 2.28 kilometers in 120 seconds. Over the course of the experiment, the receivers onboard the base and the UAV were listening to two Orbcomm SVs, FM 108 and FM 116. The SVs transmit their position as estimated by their onboard GPS receivers. These positions were decoded and used as ground truth. A position estimate of FM 108 and FM 116 was also obtained from TLE files and SGP4 software. The satellites were simultaneously visible for 2 minutes. Since only two satellites were visible at a time, which is the case with many of the current LEO constellations, an extended Kalman filter (EKF) was used to estimate the three-dimensional position and velocity of the UAV from single-difference measurements. To demonstrate the potential of the CDLEO navigation framework, two frameworks were implemented for comparison: a modified version of the CD-LEO framework, and a non-differential framework that employs carrier-phase LEO measurements from the UAV's receiver only.

To demonstrate the potential of the CD-LEO navigation framework, two frameworks were implemented for comparison: (i) a modified version of the CD-LEO framework discussed in Section II and (ii) a non-differential framework that employs carrier phase LEO measurements from the UAV's receiver only. The results of each framework are presented.

CD-LEO Framework Experimental Results

Single difference measurements provide more information on the SV-to-receiver geometry than double difference measurements since the differencing matrix T is not applied. This comes at the cost of an additional state to be estimated: the common clock bias $\delta t_r^{(R,B)}(k)$.

To this end, the UAV's position and velocity states were estimated along with the common clock bias and constant ambiguity. The UAV's position and velocity were assumed to evolve according to a nearly constant velocity model, and the common clock state was assumed to evolve according to the standard model of double integrator driven by noise.

A prior for the UAV position and velocity was obtained from the UAV's on-board system. The prior was used to initialize the EKF. After initialization, the EKF was using single-difference Orbcomm LEO SV measurements to estimate the states of the UAV. To study the effect of ephemeris errors on the navigation solution, two EKFs were implemented: (i) one that uses the Orbcomm LEO SV positions estimated by the SVs' on-board GPS receiver and (ii) one that uses the Orbcomm LEO SV positions estimated from TLE files. The estimated trajectories are shown in FIG. 10. Note that since the UAV mainly travels in the North direction, the East direction becomes poorly estimable; hence, the 3σ bounds in the East direction increase at a higher rate than the 3 σ bound in the North direction. The 3-D position root mean squared errors (RMSEs) and final errors are shown in Table I.

To demonstrate the importance of the CD-LEO framework, a non-differential LEO framework is implemented. To this end, the UAV's position and velocity are estimated in an EKF using the non-differential measurements. In this case, two clock biases must be estimated capturing the difference between the receiver's clock bias and each of the Orbcomm LEO SVs' bias. The same dynamics models and initialization method employed in Subsection V-B were used in the non-differential framework. Similarly to Subsection V-B, two EKFs were implemented: (i) one that uses the Orbcomm LEO SV positions estimated by the SVs' on-board GPS receiver and (ii) one that uses the Orbcomm LEO SV positions estimated from TLE files. The estimated trajectories are shown in FIG. 17.

Table I summarizes the experimental results for the CDLEO and non-differential LEO frameworks. It can be seen that the residuals in the non-differential carrier phase measurements are on the order of kilometers, which explains the unacceptably large RMSEs of the non-differential framework. While using the SV positions transmitted by the Orbcomm SVs reduces the RMSEs, the errors remain unacceptably large in the non-differential framework due to other unmodeled errors. Such errors cancel out in the CDLEO framework, yielding acceptable performance whether SV positions from GPS or TLE are used. The accuracy of these results is unprecedented, considering that (i) only 2 LEO SVs were used, (ii) no other sensors were fused into the navigation, and (iii) these LEO SVs are not intended for navigation and are exploited opportunistically. The double difference residual due to ephemeris errors was calculated. During the experiment, the baseline varied between 20 m and 200 m.

The UAV's position and velocity states were estimated along with the common clock bias and the constant ambiguity. Note that the constant ambiguity was lumped into the constant clock bias. The UAV's position and velocity were assumed to evolve according to a nearly constant velocity model, and the common clock state was assumed to evolve according to the standard model of double integrator driven by noise. A prior for the UAV position and velocity was obtained from the UAV's onboard system and was used to initialize the EKF. After initialization, the EKF was using single-difference Orbcomm LEO SV measurements to estimate the states of the UAV. To study the effect of ephemeris errors on the navigation solution, two EKFs were implemented: one that uses the Orbcomm LEO SV positions estimated by the SVs' on-board GPS receiver, and one that uses the Orbcomm LEO SV positions estimated from TLE files. The estimated trajectories are shown in FIG. 17. The 3D position root mean squared errors (RMSEs) and final errors for both EKFs are shown in Table I.

Non-Differential LEO Experiment

To demonstrate the importance of the CD-LEO framework, a non-differential LEO framework is implemented. To this end, the UAV's position and velocity are estimated in an EKF using the non-differential measurements. In this case, two clock biases must be estimated capturing the difference between the receiver's clock bias and each of the Orbcomm LEO SVs' bias. The same dynamics models and initialization method employed in the section above were used in the non-differential framework. Similarly, two EKFs were implemented, and the estimated trajectories are shown in FIG. 17. The 3D position RMSEs and final errors for both EKFs are shown in Table I.

TABLE 1

EXPERIMENTAL RESULTS RMSEs AND FINAL ERRORS

| Framework | SV position source | RMSE | Final error |
|---|---|---|---|
| CD-LEO | GPS | 14.8 m | 3.9 m |
| CD-LEO | TLE | 15.0 m | 4.8 m |
| Non-differential | GPS | 338.6 m | 590.4 m |
| Non-differential | TLE | 405.4 m | 759.5 m |

A differential framework for opportunistic navigation with carrier phase measurements is discussed from megaconstellation LEO satellites. A computationally efficient integer ambiguity resolution algorithm was proposed to reduce the size of the ILS problem, with simulation using the Starlink constellation as a specific megaconstellation example showing a 60% reduction in the size of the ILS problem while maintaining optimality. Moreover, the joint pdf of the megaconstellation LEO satellites' azimuth and elevation angle was derived. A performance characterization of the proposed CDLEO framework was conducted using derived joint azimuth and elevation angle pdf, showing the potential of LEO satellite signals for precise navigation. The performance characterization conducted herein also facilitates system parameter design to meet desired performance requirements. Experimental results were presented showing a UAV navigating for 2.28 km exclusively using signals from only two Orbcomm LEO SVs via the proposed framework with an unprecedented position RMSE of 14.8 m over a period of 2 minutes.

While this disclosure has been particularly shown and described with references to exemplary embodiments thereof, it will be understood by those skilled in the art that various changes in form and details may be made therein without departing from the scope of the claimed embodiments.

What is claimed is:

1. A method for navigation using differential carrier phase measurement of low earth orbit (LEO) satellite signals, the method comprising:
    receiving, by a device, one or more low earth orbit (LEO) satellite signals;
    receiving, by the device, observables for the one or more LEO satellite signals from a base;
    determining, by the device, a position estimate for the device using carrier phase determinations of the one or more LEO satellite signals received by the device and the observables from the base;

correcting, by the device, the position estimate, wherein correcting is based on an integer ambiguity resolution operation and double difference carrier phase determination for the one or more LEO satellite signals; and determining, by the device, at least one navigation observable using a corrected position estimate.

2. The method of claim 1, wherein the device receives signals from at least two LEO satellite vehicles, and wherein receiving includes receiving estimates of LEO satellite vehicle position.

3. The method of claim 1, wherein the device receives base position and carrier phase observables determined by the base, the base having a known position.

4. The method of claim 1, wherein determining a position estimate includes determining a position estimate for the device in at least one of a stationary and moving state.

5. The method of claim 1, wherein determining a position estimate includes performing a batch-weighted nonlinear least squares (B-WNLS) operation over a window of steps.

6. The method of claim 1, wherein determining a position estimate includes performing an extended Kalman filter operation to estimate position and velocity of the device from single difference measurements.

7. The method of claim 1, wherein carrier phase determinations include differential carrier phase measurements using a simultaneous tracking and navigation framework (STAN) to estimate LEO satellite vehicle states.

8. The method of claim 1, wherein correcting the position estimate includes performing a point-solution weighted non-linear least squares (PS-WNLS) estimator to estimate rover position in real time.

9. The method of claim 1, wherein correcting the position estimate includes performing a joint probability density function (pdf) of megaconstellation LEO satellite azimuth and elevation angles to characterize a LEO satellite sources.

10. The method of claim 1, wherein the navigation observable includes real-time position of the device.

11. A device configured for navigation using differential carrier phase measurement of low earth orbit (LEO) satellites, the device comprising:

a receiver configured to
receive one or more low earth orbit (LEO) satellite signals, and
receive observables for the one or more LEO satellite signals from a base; and a controller configured to
determine a position estimate for the device using carrier phase determinations of the one or more LEO satellite signals received by the device and the observables from the base;
correct the position estimate, wherein correcting is based on an integer ambiguity resolution operation and double difference carrier phase determination for the one or more LEO satellite signals; and
determine at least one navigation observable using a corrected position estimate.

12. The device of claim 11, wherein the receiver receives signals from at least two LEO satellite vehicles, and wherein receiving includes receiving estimates of LEO satellite vehicle position.

13. The device of claim 11, wherein the receiver receives base position and carrier phase observables determined by the base, the base having a known position.

14. The device of claim 11, wherein determining a position estimate includes determining a position estimate for the device in at least one of a stationary and moving state.

15. The device of claim 11, wherein determining a position estimate includes performing a batch-weighted nonlinear least squares (B-WNLS) operation over a window of steps.

16. The device of claim 11, wherein determining a position estimate includes performing an extended Kalman filter operation to estimate position and velocity of the device from single difference measurements.

17. The device of claim 11, wherein carrier phase determinations include differential carrier phase measurements using a simultaneous tracking and navigation framework (STAN) to estimate LEO satellite vehicle states.

18. The device of claim 11, wherein correcting the position estimate includes performing a point-solution weighted non-linear least squares (PS-WNLS) estimator to estimate rover position in real time.

19. The device of claim 11, wherein correcting the position estimate includes performing a joint probability density function (pdf) of megaconstellation LEO satellite azimuth and elevation angles to characterize a LEO satellite sources.

20. The device of claim 11, wherein the navigation observable includes real-time position of the device.

* * * * *